United States Patent [19]

Tjahjadi et al.

[11] Patent Number: 4,894,847
[45] Date of Patent: Jan. 16, 1990

[54] HIGH SPEED HALF DUPLEX MODEM WITH FAST TURNAROUND PROTOCOL

[75] Inventors: Taruna Tjahjadi, Duluth; German E. Correa, Alpharetta; Matthew F. Easley, Lilburn; John N. Martin, Atlanta; Charles H. McCorvey, Jr., Dunwoody; Randy D. Nash, Dacula; Cynthia A. Panella, Alpharetta; Michael L. Rubinstein; Martin H. Sauser, Jr., both of Atlanta; David F. Strawn; George R. Thomas, both of Marietta, all of Ga.

[73] Assignee: Hayes Microcomputer Products, Inc., Norcross, Ga.

[21] Appl. No.: 54,419

[22] Filed: May 26, 1987

[51] Int. Cl.⁴ .............................................. H04L 23/00
[52] U.S. Cl. ...................................... 375/121; 375/8; 370/84
[58] Field of Search .................. 370/24, 31, 32, 84; 375/7, 8, 9, 13, 121; 379/97, 98, 93

[56] References Cited

U.S. PATENT DOCUMENTS

| | | | |
|---|---|---|---|
| 4,000,371 | 12/1976 | Ogawa | 179/2 DP |
| 4,215,243 | 7/1980 | Maxwell | 179/2 DP |
| 4,419,751 | 12/1983 | Cholat-Namy et al. | 370/17 |
| 4,438,511 | 3/1984 | Baran | 370/19 |
| 4,606,044 | 8/1986 | Kudo | 375/13 |
| 4,621,366 | 11/1986 | Cain et al. | 375/8 |
| 4,669,090 | 5/1987 | Betts et al. | 375/13 |
| 4,672,630 | 6/1987 | Kakv | 375/13 |
| 4,680,773 | 7/1987 | Amundson | 375/121 |
| 4,680,781 | 7/1987 | Amundson et al. | 375/8 |
| 4,734,780 | 3/1988 | Iwata et al. | 375/13 |
| 4,782,498 | 11/1988 | Copeland | 375/8 |

Primary Examiner—Robert L. Griffin
Assistant Examiner—Stephen Chin
Attorney, Agent, or Firm—Jones, Askew & Lunsford

[57] ABSTRACT

A modem with improved signal processing and handshaking capabilities as described. Two digital signal processors are used to perform independent, concurrent operations so that a faster execution rate is obtained and more precise calculations are made possible. The modem also uses an improved handshaking technique which allows the modem to maintain compatibility with existing 1200 and 2400 bps modems while allowing for negotiation for 4800 and 9600 bps communications. The modem also incorporates an improved baud clock recovery circuit which dynamically adjusts the actual sampling point in a manner dependent upon the difference between the actual sampling point and the optimal sampling point. This allows the actual sampling point to converge upon the desired sampling point at a high rate while minimizing jitter around the optimal sampling point.

54 Claims, 10 Drawing Sheets

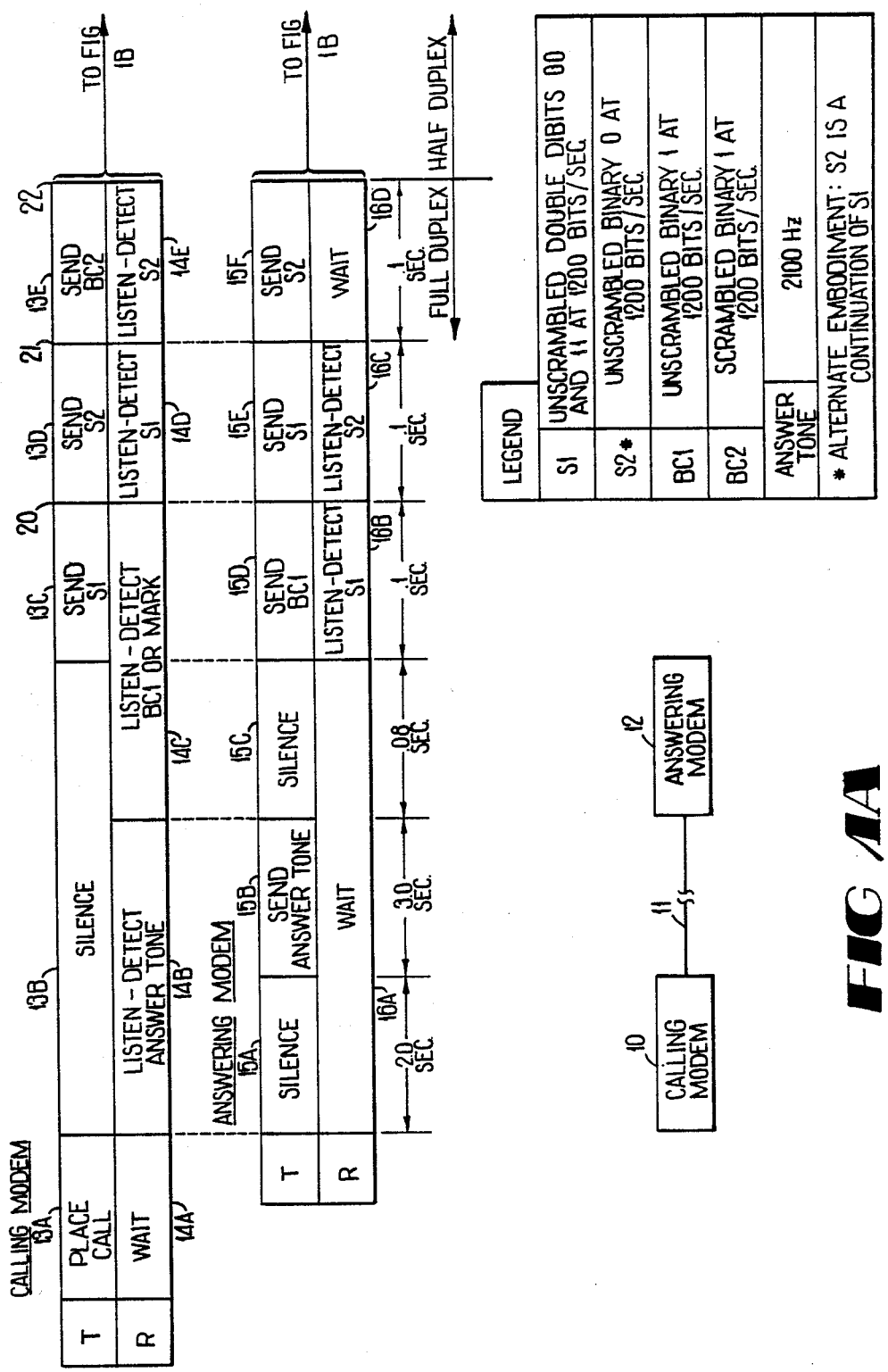

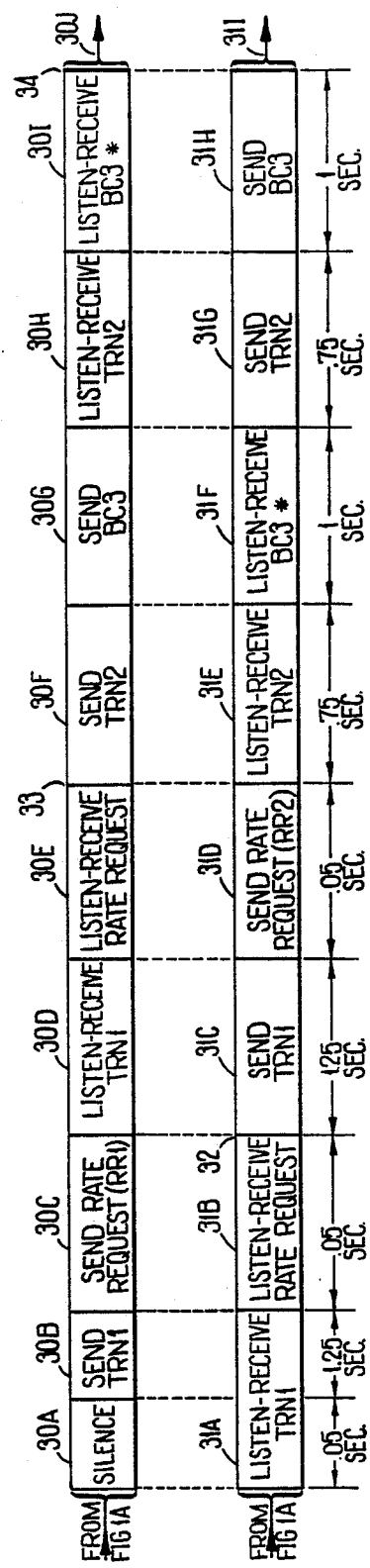
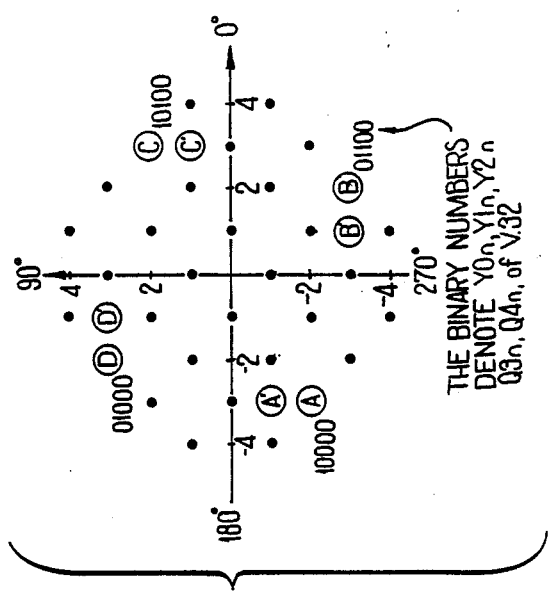
FIG. 1B
FIG. 2

NOTE: T1 = 320 Hz TONE

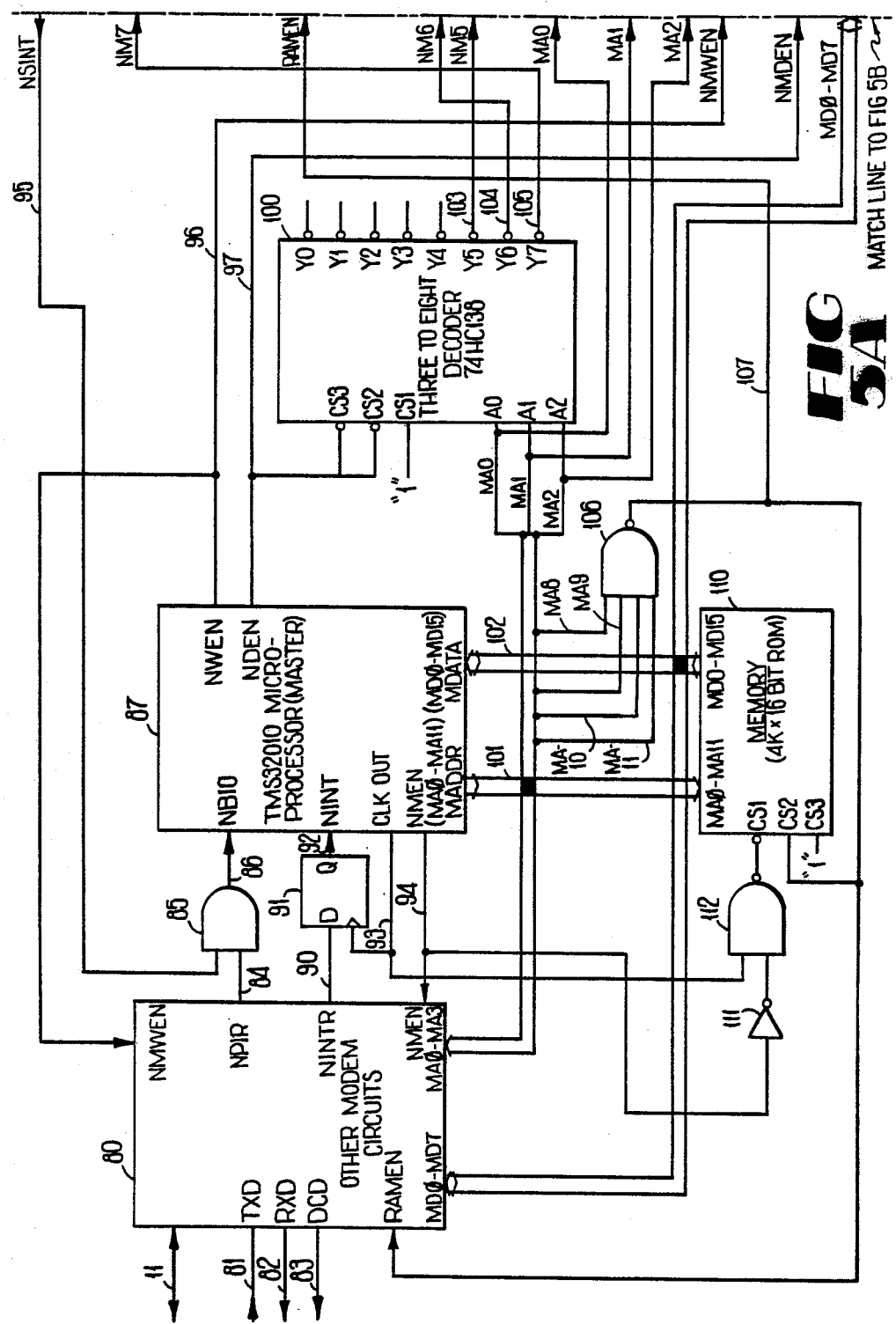

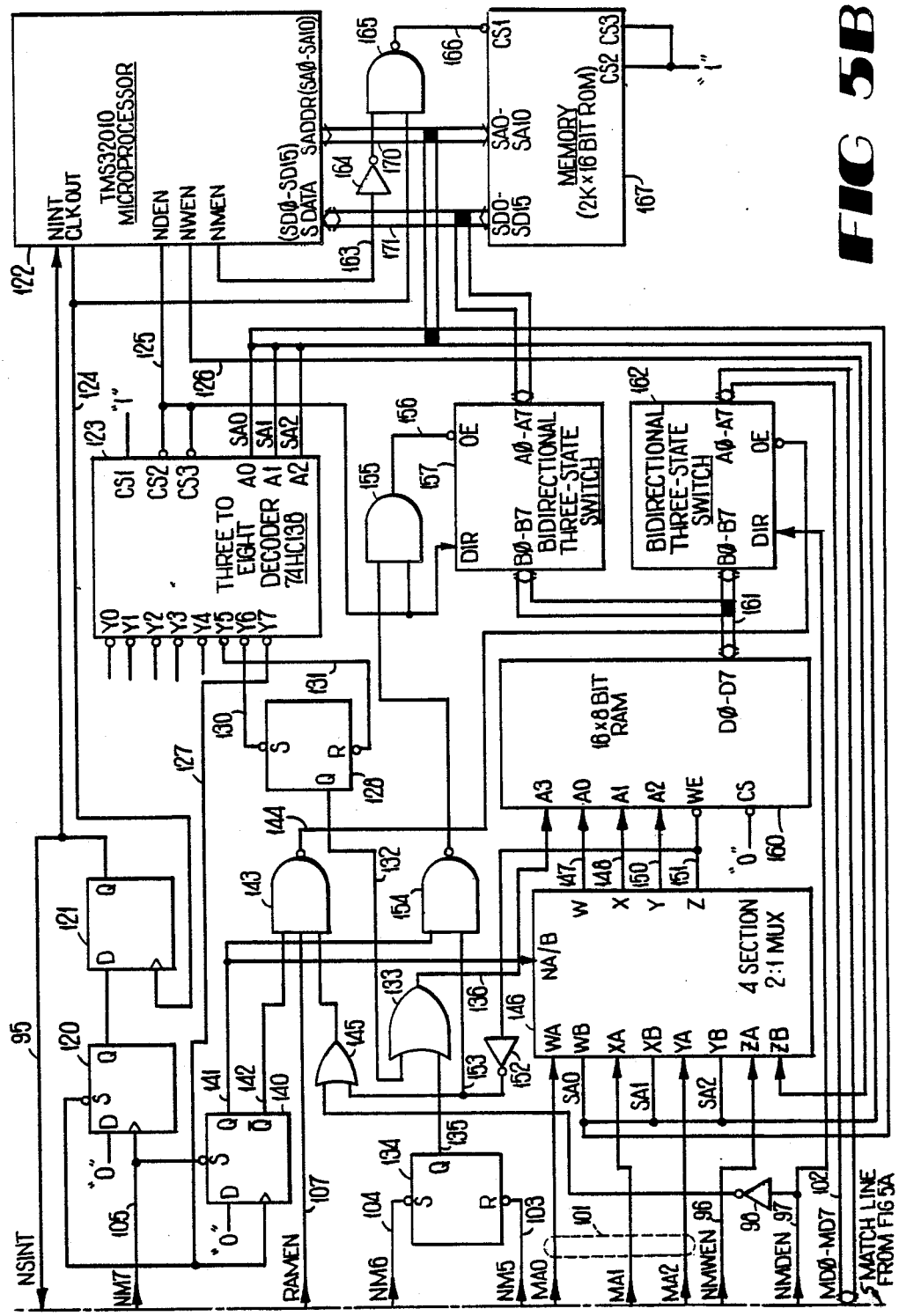

HIGH SPEED HALF DUPLEX MODEM WITH FAST TURNAROUND PROTOCOL

TECHNICAL FIELD

The present invention relates to data communications and transfer and particularly describes a high speed, half duplex modem having a high speed handshaking procedure and a half duplex fast line turnaround protocol.

BACKGROUND OF THE INVENTION

The widespread use of computing devices in the home and the office created a need for a means whereby data could be quickly and conveniently transferred from one computing device to another computing device. Modems (modulator-demodulator), in conjunction with the public telephone network, substantially fulfill this need. Modems convert the digital data used by a computing device into an analog signal capable of being transmitted over the public telephone system.

Full duplex operation (the ability to send and receive at the same time) is typically preferred. Also, as the amount of data to be transferred from one device to another is increased, higher data rates (in bits per second) are generally desired in order to reduce connection time and telephone charges, especially where long distance communications are involved. However, a typical telephone line has a limited bandwidth, approximately three kiloHertz, and this limited bandwidth, in conjunction with background noise, crosstalk, and transmission line phase and amplitude distortion, places an upper limit on the rate at which data can be successfully transferred over the telephone line.

In the United States, communication data rates up to 2400 bits per second (bps) are typically full duplex communications and communication data rates in excess of 2400 bps are typically half duplex communications, i.e., a modem can send or receive but not both at the same time.

Some modems can communicate at a data rate of up to 1200 bps, other modems can communicate up to 2400 bps, and some modems can communicate up to 9600 bps. In order for one modem to communicate with another modem, the two modems must agree upon a common data rate. The method by which the two modems agree upon the data rate is commonly called "handshaking". Recommendation V.22 bis of the International Telegraph and Telephone Consultative Committee (CCITT) recommends a handshaking procedure which allows two modems to negotiate whether data will be transferred at 1200 or 2400 bps. However, there is no corresponding recommendation which allows the modems to negotiate whether the data will be transferred at 1200, 2400, 4800 or 9600 bps. Therefore, there is a need for a handshaking procedure which supplements CCITT V.22 bis so as to provide a uniform handshaking method for data transfer rates up to 9600 bps.

Full duplex communications are generally available where the data transfer rate is 2400 bps or less. However, where the data transfer rate is in excess of 2400 bps, full duplex communications devices are often expensive and half duplex operation becomes desirable. With half duplex operation, it becomes desirable for a first modem to instruct a second modem that the first modem is through transmitting and is now ready to receive. CCITT recommendation X.25 provides a frame format for the exchange of data and control information. However, the X.25 format provides more information and control bits than are absolutely necessary. Since these bits must be transmitted with each frame then some of the time which could be used to transmit data is wasted transmitting unnecessary or unused control and information bits. Therefore, there is a need for a half duplex format which uses a minimum number of control and information bits, especially for a control frame where a first modem is advising a second modem that it has no data to transfer.

Most modems use one or two microprocessors to execute the modem functions. However, at a 9600 bps communication rate, instruction execution time may become a limiting factor. Of course, a very high speed microprocessor could be used if the additional cost, power consumption, and localized heat generation can be accommodated. Lower speed, less expensive microprocessors could be used provided that their functions were divided so as to be concurrent and nonoverlapping and provided there was a means of communicating data between the two microprocessors. Therefore, there is a need for a method for splitting the execution tasks between the two microprocessors and a means for allowing the two microprocessors to exchange the necessary data.

Although a communication rate may be described as, for example, 9600 bps, the bandwidth limitations of the telephone line prevent individual bits from being serially transmitted at 9600 bps. In order to achieve an effective data rate of 9600 bps a series of bits is grouped together to form a set of bits. One example of such a set is a quadbit (four bits). The quadbit is then used to modulate the phase and amplitude of the carrier signal. The quadbit is updated at a frequency known as the baud rate. Therefore, if the effective communications rate is 9600 bps, and quadbits are used, then the baud rate is 9600/4=2400 baud. However, in order to accurately recover the quadbit, it is necessary to sample the incoming signal at approximately the same place in each baud. This is accomplished by processing a signal to recover the baud clock. Typically, an oscillator is set to approximately the baud clock frequency and the incoming signal is used to adjust the frequency and phase of this oscillator to exactly match the transmitted baud clock. The oscillator phase is often adjusted, by fixed increments, to match the baud clock phase of the incoming signal. However, if the fixed increments are too large then the oscillator will not be able to precisely track the baud clock and therefore baud clock jitter will occur. Conversely, if the increment size is too small, then it will take the oscillator an excessively long period to lock on to the transmitted baud clock. Therefore, there is a need for a baud clock recovery circuit which allows the recovered baud clock oscillator to quickly and precisely lock on to the transmitted baud clock.

SUMMARY OF THE INVENTION

The present invention provides a modulator-demodulator (modem) with improved signal processing capability, handshaking and protocol techniques, and an improved baud clock recovery circuit.

Broadly stated, the present invention may be characterized as a modem which divides the signal processing task between two digital signal processors so that independent operations may be performed in parallel, rather than in series, and a faster execution rate obtained. More particularly described, the present invention may be characterized as a method and apparatus whereby two microprocessors can exchange information by using a common random access memory (RAM).

The present invention also may be characterized as a 9600 bits per second (bps) modem which uses a handshaking technique which is compatible with many currently existing 1200 and 2400 bps modems.

Also, the present invention may be characterized as a modem which uses an improved training sequence which reduces the phase rotation effect when switching from the training mode of operation to the data exchange mode of operation.

Also, the present invention may be characterized as a modem which uses a fast line turnaround protocol so that, when operating in the half duplex mode, a minimum of time is used in turning control of the line over to a first modem when the second modem has no data to transfer.

Also, the present invention may be characterized as a modem employing a self-synchronizing divide-by-1.5 divider circuit. The divider circuit has the advantage of not using feedback pulses so that the components of the divider need not be capable of operating at a frequency higher than the reference frequency.

Also, the present invention may be characterized as a modem which uses an improved jitter-free received baud clock recovery circuit which dynamically adjusts the step size used to correct the sampling point according to the degree to which the actual sampling point differs from the desired sampling point.

The above characteristics and other improvements provided by the present invention will become apparent from a reading of the Detailed Description below.

BRIEF DESCRIPTION OF THE DRAWINGS

FIGS. 1A and 1B are an illustration of the preferred embodiment of the improved handshaking technique.

FIG. 2 is an illustration of the phase-amplitude constellation used in the preferred embodiment.

FIGS. 5A and 5B are a schematic diagram of the preferred embodiment.

DETAILED DESCRIPTION

Figure 3:
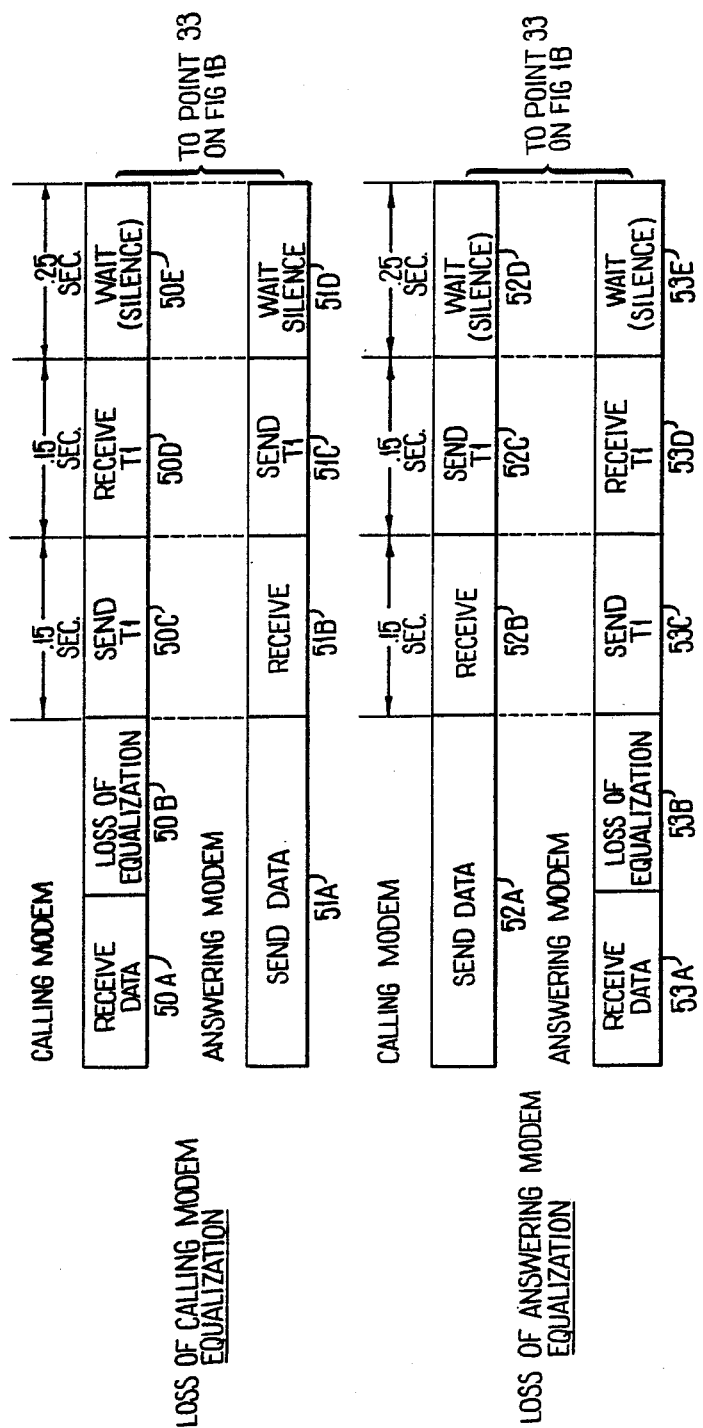
FIG. 3 is an illustration of the retraining request sequence used in the preferred embodiment.

Turning now to the drawings, in which like numerals represent like components throughout the several figures, the preferred embodiment of the present invention will be described. FIGS. 1A and 1B are an illustration of the preferred handshaking sequence. In the preferred embodiment, a calling modem 10 initiates a call to and conducts communications with an answering modem 12 over a standard telephone line 11. Each modem 10, 12 is defined as having a transmitter section (T) which places signals on telephone line 11 and a receiver section (R) which listens for and detects signals on telephone line 11. The transmitter section and receiver section of a modem may operate simultaneously, as in the full duplex mode, or alternately, as in the half duplex mode. The calling modem 10 therefore operates in the full duplex mode for sequences 13A through 13E and 14A through 14E, and operates in the half duplex mode for sequences 30A through 30I. Similarly, the answering modem 12 operates in the full duplex mode for sequences 15A through 15F and 16A through 16D, and operates in the half duplex mode for sequences 31A through 31H.

Although the primary purpose of the illustrated handshaking sequence is to determine whether communications should be conducted at 4800 or 9600 bits per second (bps), it is desirable to be able to communicate with modems which can only operate at 300, 1200 and/or 2400 bps. Therefore, the first part of the handshake sequence incorporates part of the CCITT V.22 bis handshake sequence recommendation. The transmitter section (T) of calling modem 10 places the call 13A and then enters a period of silence 13B. The receiver section (R) of calling modem 10 waits 14A while the call is being placed and then listens for and detects the answer tone 14B.

The receiver section (R) of the answering modem 12 waits 16A while the transmitter section (T) first has a period of silence 15A, then sends the 2100 Hz answer tone 15B and then enters a short period of silence 15C. At the end of the short period of silence 15C the transmitter section (T) sends 15D the BC1 sequence while the receiver section R listens for and detects the presence of the S1 sequence. In accordance with recommendation V.22 bis sequence BC1 is an unscrambled binary 1 at 1200 bps and sequence S1 is unscrambled double dibits 00 and 11 at 1200 bps.

After the receiver section R of calling modem 10 has detected 14C the BC1 sequence from answering modem 12 then the transmitter section T sends 13C the S1 sequence. Also, if calling modem 10 recognizes a silent answer by answering modem 12 then, after the silence period 13B, calling modem 10 will send 13C the S1 sequence. Normally, following the V.22 bis recommendation, the next act of the transmitter section T of calling modem 10 would be to send sequence BC2. However, in the preferred embodiment, the transmitter section T sends 13D sequence S2 before sending 13E sequence BC2. Sequence S2 is an unscrambled binary 0 at 1200 bps. Sequence S2 is of a sufficiently short duration so as not to be detected as an interruption or cause problems with handshaking with a conventional 1200 and/or 2400 bps modem.

In an alternative embodiment, sequence S2 is the same as sequence S1: unscrambled double dibits 00 and 11 at 1200 bps. CCITT recommendation V.22 bis specifies that sequence S1 shall be 100±3 milliseconds. In this alternative embodiment sequence S2 is a continuation or prolonging of sequence S1. An answering modem 12 which is not capable of speeds in excess of 2400 bps will not respond to the longer double dibit sequence. However, an answering modem 12 capable of speeds in excess of 2400 bps will recognize the prolonged double dibit sequence as being the S1 sequence and the S2 sequence and respond accordingly.

Similarly, answering modem 12 is sending 15E sequence S1 while listening for 16C sequence S2 from the calling modem 10. If answering modem 12 detects 16C the S2 sequence then answering modem 12 responds by sending 15F the S2 sequence. Calling modem 10, after sending 13D the S2 sequence begins sending 13E the BC2 sequence while listening 14E for the S2 sequence from answering modem 12. At this point 22 calling modem 10 and answering modem 12 are ready to enter the half duplex mode and begin the 4800 bps and 9600 bps handshaking sequences.

It will be noted that if, at point 20, answering modem 12 has not detected the S1 sequence then, in accordance with V.22 bis answering modem 12 continues with the V.22 bis 1200 bps handshake sequence. Similarly, if the calling modem 10 does not detect 14D the S1 sequence then, at point 21, calling modem 10 will continue with the V.22 bis 1200 bps handshake sequence.

If answering modem 12 detects 16B the S1 sequence but does not detect 16C the S2 sequence then, at point 21, answering modem 12 will continue with the V.22 bis 2400 bps handshaking sequence. Likewise, if calling modem 10 has detected 14D the S1 sequence but has not detected 14E the S2 sequence then, at point 22, calling modem 10 will continue with the V.22 bis 2400 bps handshaking sequence. Therefore, the preferred handshaking sequence maintains V.22 bis compatibility for communications with 1200 and 2400 bps modems. It will be noted that the BC2 sequence 13E has been sent by the calling modem 10 so that, in the event the S2 sequence is not returned by the answering modem, the calling modem 10 will already have begun the BC2 sequence required to maintain compatibility with and handshake with a V.22 bis 2400 bps modem.

The answering modem 12 also maintains compatibility with V.22 bis modems by sending the S1 and S2 sequences only in response to detection of the S1 and S2 sequences, respectively, being sent by the calling modem 10. Therefore, the use of the S2 sequence allows compatibility with existing V.22 bis modems to be maintained as well as providing a signaling scheme to indicate to a connected modem that higher speed (greater than 2400 bps) operation is available.

Assuming now that calling modem 10 and answering modem 12 have indicated to each other that a data rate in excess of 2400 bps is desired and that they are at point 22 preparing to exit from the full duplex mode to the half duplex mode. At first, both modems are silent. The calling modem is silent 30A and then begins sending 30B the first training signal TRN1 while the answering modem 12 listens for and receives the TRN1 training sequence and begins coarse training and adjustment of its equalizer. Training sequence TRN1 is a non-phase encoded scrambled binary 1 at 4800 bps. The non-phase encoded scrambled binary 1 is similar, but not identical, to that defined by CCITT recommendation V.32, Section 5.2.3 and FIG. 1. After the completion of training sequence TRN1 calling modem 10 then sends 30C a preferred communication speed rate request RR1. If calling modem 10 prefers communications at 4800 bps then RR1 is a scrambled binary 1 at 4800 bps. However, if calling modem 10 prefers communication at 9600 bps, then RR1 will be a scrambled binary dibit 01 at 4800 bps. When calling modem 10 has finished sending 30C rate request RR1 it ceases transmitting.

Answering modem 12, upon detecting the end of transmission of the rate request RR1, begins sending 31C the first training sequence TRN1. Accordingly, calling modem 10 receives 30D the first training sequence TRN1 and begins the coarse training and adjustment of its equalizer. Upon completion of sequence TRN1 answering modem 12 sends 31D rate request RR2. If RR1 requested 4800 bps then RR2 will simply acknowledge the 4800 bps request. However, if RR1 was a request for 9600 bps then RR2 may be a confirmation of the 9600 bps request, in which case communications will be at 9600 bps, or a denial of the 9600 bps request, in which case communications will commence at the 4800 bps rate. Calling modem 10 receives 30E the rate request RR2 from the answering modem 12. If RR1 or RR2, or both, designated 4800 bps, then, at point 33, modems 10 and 12 have completed the handshaking and can commence to communicate at 4800 bps.

However, if RR1 and RR2 both requested 9600 bps, then, at point 33, modems 10 and 12 will commence the 9600 bps training sequences.

After answering modem 12 has ceased sending 31D its rate request RR2 then calling modem 10 begins sending 30F the second training sequence TRN2. Sequence TRN2 is a non-phase encoded binary 1 at 9600 bps. For TRN2 the output of the scrambler is grouped into quadbits and the last dibits of successive quadbits are encoded into the A,B,C and D signal states (FIG. 2). While calling modem 10 is sending 30F sequence TRN2 the answering modem 12 is receiving 31E sequence TRN2 and training its equalizer.

After calling modem 10 has completed sending sequence TRN2 it then sends 30G sequence BC3. Sequence BC3 is a scrambled binary 1 transmitted at 9600 bps. Answering modem 12 receives 31F sequence BC3 and performs the final adjustment and training of its equalizer. As soon as calling modem 10 finishes sending sequence BC3 answering modem 12 begins sending 31G sequence TRN2 so that calling modem 10 can receive 30H the sequence and begin training its equalizer. After sending sequence TRN2 answering modem 12 sends 31H the final sequence BC3. Calling modem 10 receives 30I sequence BC3 and performs the final adjustment and training of its equalizer. After the completion of sending sequence BC3 by answering modem 12 the modems are ready to begin half duplex communications at 9600 bps. In the preferred embodiment, at stages 30I and 31F, the receiving modem must detect at least 32 consecutive binary 1's. If this number is not detected, then the receiving modem will request that sequences TRN2 and BC3 be sent again. This request is the same as that used to indicate a loss of equalization. The periods of silence and of sending a particular sequence are nominal and some variation is allowable without disturbing the handshaking sequence.

The present invention is also compatible with 300 bps frequency shift keyed (FSK) modems. If answering modem 12 in a 300 bps modem or is set to answer at 300 bps, then answering modem 12 will not send the answer tone or the BC1, S1, S2 sequence, but will send a mark idle signal at 2250 Hz. Therefore, at point 22, calling modem 10 will, by default, switch to the FSK mode to connect with answering modem 12. However, if answering modem 12 has speed fall-up capability and is set to allow fall-ups then, in response to the S1,S2 and BC2 sequences from calling modem 10, answering modem 12 will send the BC1, S1 and S2 sequences, as appropriate, and as described above, to allow the connection at speeds greater than 300 bps.

Likewise, if calling modem 10 is a 300 bps modem or is set to originate at 300 bps then calling modem 10 will not send the S1, S2 or BC2 sequences but will send a mark idle signal at 1270 Hz. Therefore, if by point 20, answering modem 12 has not detected the S1 or BC2 sequences answering modem 12 will look for the mark signal. If the mark signal is present answering modem 12 will switch to the FSK mode, send the mark signal at 2250 Hz and then connect with calling modem 10 at 300 bps. However, if calling modem 10 has speed fall-up capability and is set to allow fall-up then, in response to the BC1 sequence sent by answering modem 12, calling modem 10 will send the S1, S2 and BC2 sequences, as described above, to allow the connection at speeds greater than 300 bps.

FIG. 2 is an illustration of the preferred signal states for 4800 and 9600 bps communications. In the preferred embodiment, the 32 point signal structure with trellis coding, as depicted in FIG. 3 of V.32, is used for 9600 bps communication. Also, in the preferred embodiment, signal states A, B, C, and D are used for 4800 bps training and communications. Dibits 00, 01, 10, and 11 correspond to signal states A,B,C and D, respectively. As previously stated, TRN1 and TRN2 are non-phase encoded meaning that differential quadrant encoding is not used. It will be appreciated that the A, B, C and D points are a 4 point subset of the 32 point signal structure. Making the 4 point training structure a subset of the 32 point signal structure reduces the rotation effect when changing from a 4 point decision process (training) to a 32 point decision process (9600 bps communications). The CCITT recommendation V.32 training points are shown as A', B', C' and D' in FIG. 2. It will be noted that the V.32 training points are not a precise subset of the 32 point signal structure and therefore the equalizer must compensate for the rotation effect encountered when switching from the 4 point training process to the 32 point decision process.

TABLE 1

| NON-PHASE ENCODED SIGNAL STATES | |
|---|---|
| DIBIT | SIGNAL STATE |
| 00 | A (−3,−2) |
| 01 | B (+2,−3) |
| 10 | C (+3,+2) |
| 11 | D (−2,+3) |

Trellis coding is preferred because of its error detecting and correcting capability. In an alternative embodiment, trellis coding is not used for 9600 bps communications. In this alternative embodiment, the 16 point signal structure, and the 4 point subset thereof, of FIG. 1 of CCITT recommendation V.32 is used for training, 4800 bps communications, and 9600 bps communications.

Turn now to FIG. 3, which is an illustration of the loss of equalization/retrain request sequence. Assume that the answering modem 12 is sending 51A data to the calling modem 10, and that the calling modem 10, after receiving 50A data for a period of time, undergoes a loss of equalization 50B. When answering modem 12 finishes sending 51A the data and switches to the receive mode 51B the calling modem 10 will detect the end of the data and send 50C a T1 sequence. The T1 sequence is defined as a 150 millisecond burst of a 320 Hz tone. The T1 sequence advises answering modem 12 that a loss of equalization has occurred and that retraining is requested. Answering modem 12 then confirms the request by sending 50D a 150 millisecond burst of the 320 Hz tone. At this point, both the calling modem 10 and the answering modem 12 enter wait periods 50E, 51D, respectively, which, in the preferred environment, are 250 milliseconds. At the end of the wait periods 50D, 51C, the modems go to point 33 of FIG. 1B whereupon the calling modem 10 begins sending 30F training sequence TRN2.

A similar operation occurs if the answering modem loses equalization. After the calling modem completes sending 52A the data and enters the receive mode 52B, then, if the answering modem 12, while receiving 53A data, has suffered a loss of equalization 53B, then answering modem 12 will send 53C the T1 sequence. The calling modem 10 will receive 52B the T1 sequence and confirm the request by sending 52C the T1 sequence. Both modems will then enter the wait state 52D, 53E and then go to point 33 in FIG. 1B to begin retraining sequence. It will be noted that either modem can request retraining sequence but that, after the wait state 50E, 51D, 52D, 53E the retrain sequence will begin at point 33 in FIG. 1B and the calling modem will send the training sequence first. Also, if confirmation of the request is not received the requesting modem will repeat the T1 sequence until confirmation is obtained or a time-out disconnect occurs.

Figure 4:
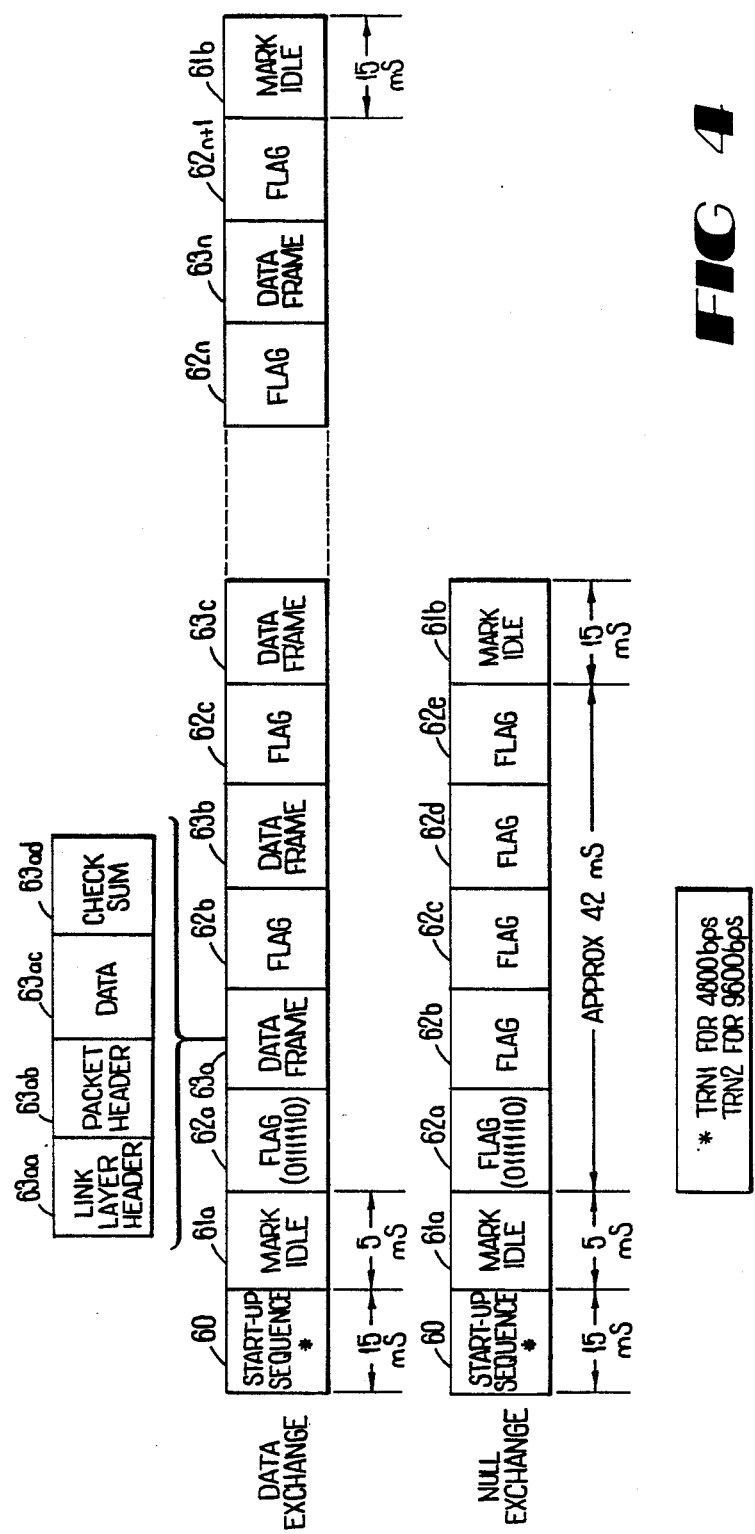
FIG. 4 is an illustration of the communications protocol used in the preferred embodiment.

Turn now to FIG. 4 which is an illustration of two types of half duplex communications between the modems: a data exchange, and a null exchange. In a data exchange, the transmitting modem, which may be either the calling modem 10 or the answering modem 12, first places a start-up sequence 60 onto line 11 for a start-up period, typically 15 milliseconds. During this start-up period 60, the transmitter provides the four point constellation training sequence, TRN1, TRN2, for 4800 bps or 9600 bps, respectively, for approximately 15 milliseconds. This training sequence allows the receiver baud clock in the receiving modem to lock on, and can, if desired, be used to begin updating of the adaptive equalizer coefficients in the receiving modem. This is followed by a 5 millisecond period 61a of the mark idle signal (scrambled 1's using 32 point constellation). The receiving modem begins looking for the mark idle signal 61a approximately 10 milliseconds after the start of reception of startup sequence 60. The transmitting modem then sends the flag 62a followed by a first data frame 63a. Flags 62 are the sequence 01111110. The receiving modem must detect 16 consecutive marks in the mark idle signal 61a before looking for flag 62a. Data frame 63a is followed by another flag 62b and a data frame 63b. Data frame 63b is followed by flag 62c and then data frame 63c. This flag/data frame process is repeated until the transmitting modem has sent the last data frame 63n and the last flag 62n+1. The transmitting modem then sends mark idle signal 61b which acts as a line turnaround signal. The receiving modem must detect at least 7 consecutive marks in mark idle signal 61b to recognize mark idle signal 61b as marking the end of the data exchange. At this point, since this is a half duplex operation, the transmitting modem now enters the receiving state and the modem which was the receiving modem now enters the transmitting state and transmits elements 60 through 63.

A data frame 63a comprises a link layer header 63aa, a packet header 63ab, a variable length data stream 63ac, and a checksum 63ad. The data string 63ac is preferably compressed data, but may be uncompressed data. Checksum 63ad preferably encompasses parts 63aa, 63ab and 63ac, but may, if desired, encompass only a selected one or two of these parts. Checksum 63ad is used, in a manner well known to those skilled in the art, to detect transmission errors in the encompassed parts, 63aa, 63ab and 63ac. In the preferred embodiment, link layer header 63aa conforms to the protocol requirements specified for LAP-B headers, and checksum 63*ad* uses the HDLC/SDLC cyclic redundancy check (CRC) algorithms.

The packet header 63*ab* carries control information. One use of header 63*ab* is to designate whether data string 63*ac* contains data or instructions (for example, the "break" instruction). Therefore, any character can be used in data string 63*ac* to convey data or, if desired, to convey instructions. Header 63*ab* is also used to transmit flow control information.

A data frame 63*a* need not contain packet header 63*ab* or data 63*ac*. For example, a supervisory data frame 63*a* which is used for link establishment, or an acknowledgement of a data reception, with no return data, would consist only of link layer header 63*aa* and checksum 63*ad*. Link layer header 63*aa* specifies whether a packet header 63*ab* exists.

The presence or absence of data 63*ac* is determined in an inverse fashion. The data frame 63*a* is defined as that information between flags, such as flags 62*a* and 62*b*. A data frame, such as 63*a*, always contains link layer header 63*aa* and checksum 63*ad*, and header 63*aa* specifies whether packet header 63*ab* exists. Therefore, when the flag at the end of frame 63*a* is detected, any information between header 63*ab* and checksum 63*ad* is defined as data 63*ac*. The result is that the length of an individual data frame, such as 63*a*, will be dependent upon the control and/or data information transferred.

Assume that a first device (not shown), connected to modem 10, can output data at a very high rate and a second device (not shown), connected to modem 12, can accept data at a slower rate. If modem 10 is allowed to transfer data to modem 12 as fast as the first device can output the data, the buffer in the second device will eventually overflow and data will be lost. Therefore, the receiving modem, modem 12 in this example, sends a credit or a permit to the sending modem, modem 10 in this example, advising modem 10 how many data frames or packets 63*a* that the sending modem may transmit. In the preferred embodiment, as explained below, a maximum of seven data frames 63*a* is permitted. If modem 12 sends modem 10 a credit of four then, once modem 10 has sent four data frames 63*a*, modem 10 cannot send any more data frames until modem 12 provides modem 10 with another credit figure. Therefore, if the second device advises modem 12 that its buffer is full or substantially full, modem 12 will not send any additional credits to modem 10. Modem 10 will then advise the first device to stop outputting data. Once the buffer in the second device has room for more data the second device will advise modem 12 that it is ready to accept more data. Modem 12 will send a credit to modem 10, and modem 10 will advise the first device to send more data to modem 10 for transmission to modem 12. This process is repeated until the first device has no more data to output.

Link layer header 63*aa* also contains information on the number of the next frame expected to be received. If the receiving modem receives a frame with a number different than that expected, the receiving modem will advise the transmitting modem that an error has occurred and provide the frame number expected to be received. The transmitting modem will then retransmit the data, beginning with this frame number.

In the preferred embodiment, the maximum data transmission length for the series of flags 62*a* to 26*n*+1 and data frames 63*a* to 63*n* is approximately 900 bytes. Also, the length of each individual data frame 63 is limited to approximately 128 bytes, and there can be up to seven data frames 63 in a data exchange. At 9600 bps this yields a maximum transmission time of less than 1 second. Therefore, one modem can only retain control of the line for less than 1 second before relinquishing control to the other modem. This prevents the users from having to wait for an excessive period before being able to send a new instruction or additional data. This limitation on the transmission length also assures that the transmitting modem periodically receives data so that the receiver carrier clock and receiver baud clock timing recovery circuits are periodically resynchronized to the clocks in the other modem.

Also, the null exchange can be sent in approximately 77 milliseconds so that, when neither modem has data to send and then one of the modems has data to send, the modem with data to send can quickly obtain control of the line.

In accordance with X.25 LAPB procedure, each transmission is acknowledged by use of header 63*aa*. However, situations frequently arise wherein neither modem has data to transfer but it is desired to maintain the connection over telephone line 11. In such situations it is also desirable to minimize the turnaround time and protocol so that when one modem has data to transfer there is not a long wait while the other modem is still sending the no data line turnaround protocol. The null exchange meets these requirements. The null exchange comprises a carrier startup sequence 60, typically 15 milliseconds, 5 milliseconds of mark idle 61*a* signal, five flags 62*a*–62*e*, and 15 milliseconds of mark idle 61*b* signal. The flags 62 are, again, the sequence 01111110. Also, as above, the receiving modem must detect at least 16 consecutive 1's in mark idle signal 61*a* and 7 consecutive 1's in mark idle signal 61*b*. It will be appreciated that the null exchange is similar to the data exchange but does not have data frames 63*a*–63*n* or flags separating the data frames.

The null exchange may also be used to indicate an error condition. In the preferred embodiment, if a modem sends data, other than an acknowledgement, and gets a null exchange response, then the sending modem will assume that the data was lost. The sending modem will then query the receiving modem to determine which frame the receiving modem expects to receive next. The sending modem then begins retransmission, starting with the indicated frame. The query and retransmission are similar to the LAP-B protocol specifications.

In an alternative embodiment, each modem measures, or is programmed to assume, the period of time between the end of its transmission and the beginning of the receipt of the transmission from the other modem. This period ($T_{PT}$) includes the roundtrip propagation time and the turnaround time of the other modem. After period $T_{PT}$ is measured for several data transfer cycles, the null exchange is not sent but, after the end of a transmission, the transmitting modem waits for period $T_{PT}$ plus a safety factor period ($T_{SF}$). If nothing has been received at the end of $T_{PT}+T_{SF}$, then the transmitting modem presumes that the receiving modem received the data correctly and has nothing to send. The transmitting modem then resumes transmission. Therefore, the turnaround time is reduced and the data throughput is increased by eliminating the time required to send a null exchange.

In order to verify that the connection between the modems is still valid, the transmitting modem periodically polls the receiving modem and, in response, the receiving modem sends a response, such as the null exchange. Alternatively, the receiving modem periodically sends an advisory, such as the null exchange, to advise the transmitting modem that the receiving modem is still connected. If the response or the advisory is not received, then the transmitting modem assumes that the connection has been broken and accordingly advises the device to which it is connected (such as a computer).

Operation at different speeds is also provided. For example, the calling modem 10 and the answering modem 12 may initially agree to communicate at 9600 bps. Assume now that the noise level of telephone line 11 substantially increases for communications in the direction from modem 10 to modem 12, but does not increase for communications from modem 12 to modem 10. Communications in both directions could be dropped to 4800 bps, but this does not take advantage of the fact that 9600 bps communications are still possible in one direction.

Therefore, in one alternative embodiment, each modem sends, preferably as part of packet header 63ab, a one bit indication of the received signal quality.

For example, a logic 1 for this bit indicates that 9600 bps reception is good, and a logic 0 indicates that 9600 bps reception is not good. The other modem then inspects this bit to determine whether its transmission should be at 4800 bps or 9600 bps, and transmits accordingly.

This allows the two modems to communicate at different speeds. In the example above, calling modem 10 would transmit at 4800 bps and receive at 9600 bps, and answering modem 12 would transmit at 9600 bps and receive at 4800 bps. Therefore, telephone line 11 is used to its maximum capacity. The received signal quality is, of course, determined by the receiving modem. Means of measuring received signal for example, by measuring the received data error rate, are well known to those skilled in the art.

The above is not limited to 4800 or 9600 bps selection but, by using two or more bits, can also be used to allow speed fallup and speed fallback for 300, 1200, 2400, 4800 and 9600 bps.

There may be cases where the noise level is so severe as to prevent either modem from receiving fallback instructions from the other modem. In such cases, the failure to receive a speed instruction will, after a predetermined timeout period, for example, 250 milliseconds, cause the modem to automatically fall back to the next lower speed until communications are reestablished, another timeout occurs, or a disconnect occurs. Therefore, the modem falls back from 9600 bps to 4800 bps, then 4800 bps to 2400 bps, and so forth.

In the preferred embodiment, to achieve fast line turnaround, the received data baud clock is updated, even though not used, when transmitting in the half-duplex mode. Likewise, the transmit data baud clock is updated, even though not used, when receiving in the half-duplex mode. This allows the baud clocks to free-run when not being used so that, when the line is turned around, the baud clocks will not be starting at an arbitrary position but will have remained, within the clock accuracy tolerance, in synchronization. Likewise, the transmit data carrier and receiver demodulation carrier are updated, even when not in use, so that as the modem alternates between the transmit and receive modes, a minimum of adjustment is required to maintain synchronization with the connected modem.

Maintaining the clocks and carriers in this manner allows a fast line turnaround rate to be achieved since minimal time is required for synchronization between the modems. Also, the equalizer coefficients are frozen while in the transmit mode. When returning to the receive mode, the equalizer coefficients are not updated for at about 24 milliseconds. This delay allows time for the transmitter of the other modem to stabilize and prevents the equalizer coefficients from being incorrectly updated. This technique also assists in achieving a fast line turnaround rate. The result of the high speed (4800 or 9600 bps), the fast line turnaround capability, and the specified maximum transmission length is to provide half-duplex operation which closely simulates the performance obtainable from full duplex operation.

The trailing mark idle 61b provides for detection of end of transmission and is used by the receiving modem as a signal to change the operation of adaptive circuits, such as: freeze the equalizer tap coefficients, and begin free-running the receiver baud clock phase locked loop. This prevents these adaptive circuits from trying to adapt to the no-signal condition occurring after the other modem ceases transmitting.

In the preferred embodiment, the master microprocessor and the slave microprocessor generate the above clocks, carriers, and equalizer coefficients.

It will be appreciated that, especially at 9600 bps, the modem must process the transmitted and received data signals at a very high speed. In a preferred embodiment, in order to process the data at the required speeds, two Texas Instruments TMS 32010 digital signal processors are used in a master/slave relationship. Table 2 lists the different functions performed by the master processor and the slave processor.

TABLE 2

| MASTER AND SLAVE FUNCTIONS | | |
|---|---|---|
| MODE | MASTER FUNCTION | SLAVE FUNCTION |
| V.29 TRANS | Phase encoding, pulse shaping, filtering, modulation. | None |
| V.29 RCVR | Automatic gain control (AGC), baud timing and recovery, Hilbert transform demodulation, transferring data to the other modem circuits, sending data to the slave. | Fractionally spaced adaptive equalizer, equalizer decision, equilizer error calculation, updating adaptive equalizer coefficients, phase tracking and phase decoding |
| V.32 TRANS | Phase and Trellis encoding, pulse shaping, filtering, modulation. | None |
| V.32 RCVR | Automatic gain control, baud timing and recovery, Hilbert transform demodulation, Viterbi decoding, phase decoding. | Fractionally spaced adaptive equalizer, equalizer decision, equalizer error calculation, updating adaptive equalizer coefficients, phase tracking. |
| V.22, V.22 bis & BELL 212 TRANS | Phase encoding, pulse shaping, filtering, and modulation. | None |
| V.22, V.22 bis & BELL 212 RCVR | Automatic gain control, baud timing and recovery, Hilbert transform demodulation, transferring data from the slave to the other | Fractionally spaced adaptive equalizer, equalizer decision, equalizer error calculation, updating adaptive equalizer coefficients, phase tracking and |

TABLE 2-continued

| | MASTER AND SLAVE FUNCTIONS | |
|---|---|---|
| MODE | MASTER FUNCTION | SLAVE FUNCTION |
| | modem circuits, sending data to the slave. | phase decoding. |
| V.21 & BELL 103A TRANS & RCVR | Automatic gain control, auto-correlation, low pass filtering, mark/space decision, generating mark/space tones. | None |

It will be noted from Table 2 that one of the functions of the master processor is to transfer data between the slave processor and the other modem circuits. Therefore, it is necessary that the slave processor be able to exchange data with the master processor, and the master processor be able to exchange data with both the slave processor and with the other modem circuits.

FIGS. 5A and 5B are a schematic diagram of the preferred embodiment showing the connection between the master microprocessor, the slave microprocessor, and the other modem circuits. The other modem circuits 80 is connected to telephone line 11. Other modem circuits 80 also has an RS-232C interface, part of which is shown as transmit data (TXD) conductor 81, receive data (RXD) conductor 82, and data carrier detect (DCD) conductor 83. The use of the TXD and RXD signals is straightforward. However, in the preferred embodiment, the DCD signal does not precisely reflect the presence or absence of the data carrier in the half duplex modes.

It will be appreciated that, in the half duplex mode, there is no received data carrier when the modem is transmitting. Therefore, if the DCD signal precisely reflected the presence or absence of a data carrier then the DCD signal would indicate no carrier whenever the modem was in the transmit mode. This can cause problems with some external devices (not shown) which treat the absence of the data carrier as a disconnect or end of communication signal. Therefore, in the preferred embodiment, when operating in the half duplex mode, once the data carrier is detected the DCD signal will become and remain active until the other modem circuits 80 have disconnected from telephone line 11. The DCD signal will also remain active during momentary signal dropouts, and requests for retraining. Therefore, the external device (not shown) is not advised of an absence of carrier until the communication with the other modem has been terminated.

Other than those functions listed in Table 2 the other modem circuits 80 perform most of the remaining modem functions. A few of those remaining functions are scrambling, descrambling, line interfacing, answer and guard tone generation, etc. Means of construction of the other modem circuits 80 are well known to those skilled in the art. Also, means of construction and operation of other modem circuits 80, and of interfacing other modem circuits 80 with master microprocessor 87 are described in U.S. patent application Ser. No. 792,520, filed October 29, 1985, by Jeffery Inskeep and George R. Thomas, entitled "Improved Modem Controller", and in U.S. patent application Ser. No. 885,927, filed July 15, 1986, by Sweitzer, Nash, Correa, Easley, Tjahjadi, Panella, Thomas and Martin, entitled "Modem With Improved Digital Signal Processor", both of which are hereby incorporated herein by reference.

The negated polled interrupt request (NPIR) output of the other modem circuits 80 is connected by conductor 84 to one input of a two input AND-gate 85. The output of gate 85 is connected by conductor 86 to the negated polled interrupt request (NBIO) input of microprocessor 87. In the preferred embodiment, microprocessor 87 is a type TMS 32010 manufactured by Texas Instruments, Inc., Houston, Texas. Details of operation and programming of the TMS 32010 have been published by the manufacturer and are available upon request.

In the preferred embodiment, there are two types of polled interrupts: a memory 160 control turnaround, explained below, and a ring signal. When a ring signal is present on telephone line 11 the other modem circuits 80 will place an alternating logic 0/logic 1 signal on conductor 84. When a ring signal is not present, the other modem circuits 80 will place a logic 1 onto conductor 84. Also, as explained below, NSINT conductor 95 will have a logic 0 on it when slave microprocessor 122 has control over RAM 160, and a logic 1 on it when microprocessor 122 turns control over RAM 160 back to master microprocessor 87.

Microprocessor 87 knows whether the polled interrupt is from the other modem circuits 80 or from microprocessor 122 by the mode of operation. If communications are not in progress, then slave microprocessor 122 will be idle, and the interrupt must come from the other modem circuits 80. Likewise, once communications are in progress, then there will be no ringing signal on telephone line 11 so the interrupt must come from slave microprocessor 122.

The negated interrupt request (NINTR) output of the other modem circuits 80 is connected by conductor 90 to the D-input of flip-flop 91. The clock output (CLKOUT) of microprocessor 87 is connected by conductor 93 to the clock input of flip-flop 91. The Q output of flip-flop 91 is connected by conductor 92 to the negated interrupt (NINT) input of microprocessor 87. Microprocessor 87 therefore receives two types of interrupts from the other modem circuits 80: a polled interrupt (NBIO); and, via flip-flop 91, a synchronized interrupt (NINT). In the preferred embodiment, the other modem circuits 80 generates and provides to microprocessor 87 9600 receiver interrupts per second and 9600 transmitter interrupts per second.

Microprocessor 87 communicates with the other modem circuits 80 via a negated write enable (NWEN) signal on conductor 96, a negated memory enable (NMEN) signal on conductor 94, a four bit subset (MA0–MA3) of the 12 bit (MA0–MA11) address bus (MADDR), the lower byte (MD0–MD7) of the 16 bit (MD0–MD15) bidirectional data bus (MDATA), and an externally generated random access memory enable (RAMEN) signal on conductor 107. The RAMEN signal on conductor 107 is provided by the output of four-input NAND-gate 106 using address lines MA8, MA9, MA10 and MA11 of MADDR. The NMEN, RAMEN, and NMWEN is signals are used to write data from microprocessor 87 to the other modem circuits 80. Similarly, the NMEN and RAMEN signals are used to read data from other modem circuits 80 to microprocessor 87. Since only address lines MA0–MA3 are used, other modem circuits 80 has a 16 word latch or random access memory, each word being 8 bits long (MD0–MD7).

Microprocessor 87 derives its operating instructions and other parameters from a 4K by 16 bit read only memory (ROM) 110. The NMEN signal from microprocessor 87 is connected by conductor 94 to the input of inverter 111. The output of inverter 111 is connected to one input of a 2-input NAND-gate 112. The CLKOUT output of microprocessor 87 is connected by conductor 93 to the other input of gate 112. The output of gate 112 is connected to the negated chip select 1 (CS1) input of memory 110. The RAMEN signal on conductor 107 is connected to the chip select 2 (CS2) input of memory 110. The chip select 3 (CS3) input of memory 110 is connected to a logic 1. The 16 bit data output of memory 110 is connected to MDATA bus 102. Data is transferred from memory 110 to microprocessor 87 when RAMEN conductor 107 and CLKOUT conductor 93 are a logic 1 and NMEN conductor 94 is a logic 0. Both the other modem circuits 80 and memory 110 are located in the memory address space of processor 87. MADDR is not fully decoded, therefore memory address 000 through EFF (HEX) point to memory 110, and memory addresses F00 through FFF (HEX) point to other modem circuits 80. It will therefore be appreciated that only 3840 words of the 4096 words in memory 110 are accessible. Of course, more of memory 110 could be used, if desired, by fully decoding MADDR.

Microprocessor 87 also exchanges data with microprocessor 122 via a 16 word by 8 bit RAM 160. The data input/outputs (D0-D7) of RAM 160 are connected by bus 161 to the B0-B7 inputs/outputs of bidirectional three-state buffers 157 and 162. In the preferred embodiment, buffers 157 and 162 are SN74ALS245A octal bus transceivers. The A0-A7 inputs/outputs of buffer 162 are connected to the lower byte (MD0-MD7) of master data bus 102. The A0-A7 input/outputs of buffer 157 are connected by bus 171 to the lower byte (SD0-SD7) of the slave data bus (SDATA) input/output of slave microprocessor 122. Slave microprocessor 122 is also a type TMS 32010. Buffer 162 therefore allows microprocessor 87 to write data to and read data from RAM 160, and switch 157 allows microprocessor 122 to write data to and read data from RAM 160. Microprocessor 87 therefore sends data to microprocessor 122 by writing the data into RAM 160, whereafter microprocessor 122 reads the data from RAM 160. Similarly, microprocessor 122 sends data to microprocessor 87 by writing the data into RAM 160, whereafter microprocessor 87 reads the data from RAM 160.

The direction of data flow through buffer 162 is controlled by its direction (DIR) input which is controlled by the NMDEN signal on conductor 97. When NMDEN is a logic 0 data is transferred from RAM 160 to microprocessor 87. Conversely, when NMDEN is a logic 1, data is transferred from microprocessor 87 to RAM 160. Similarly, the negated data enable (NDEN) output of microprocessor 122 is connected by conductor 125 to the DIR input of buffer 157. A logic 1 on conductor 125 allows data to be transferred from microprocessor 122 to RAM 160 and a logic 0 allows data to be transferred from RAM 160 to microprocessor 122. It will be appreciated that the DIR signal must be used in conjunction with the negated output enable (OE) inputs of buffers 157 and 162. The generation of the negated output enable signals is described below.

RAM 160 has four address lines (A0-A3), a negated write enable (WE) input and a negated chip select (CS) input. The negated chip select input is connected to a logic 0. Three of the address lines, A0-A2, and the negated write enable input are connected to the outputs of a 4 section 2:1 multiplexer (MUX) 146. MUX 146 determines whether the MA0-MA2 address lines from master microprocessor 87 or the SA0-SA2 address lines from slave microprocessor 122 are provided to the A0-A2 address inputs, respectively, of RAM 160 via conductors 147, 148 and 150, respectively. Also, MUX 146 determines whether the negated master write enable signal (NMWEN) on conductor 96 or the negated slave write enable signal (NWEN) on conductor 126 is provided to the negated write enable input of RAM 160 via conductor 151.

Ram 160 is located in the input/output (I/O) space of processors 87 and 122. However, when performing I/O operations using the TMS 32010, only the three least significant bits, MA0-MA2, SA0-SA2, can be used. This only allows access to eight words in RAM 160. In the preferred embodiment, more than eight words are required to be transferred between processor 87 and processor 122. Therefore, the A3 input to RAM 160 was generated in a different manner. The MA0-MA2 address lines of bus 101 are connected to the A0-A2 inputs, respectively, of a 3-to-8-decoder 100, such as the 74 HC 138. The CS1 input of decoder 100 is connected to a logic 1. The negated second and third chip select inputs (CS2, CS3) are connected by conductor 97 to the NDEN output of microprocessor 87. In the preferred embodiment, only the Y5 through Y7 outputs of decoder 100 are used. The NDEN signal on conductor 97 is used, in conjunction with address lines MA0-MA2, to cause a selected one of the outputs of decoder 100 to become a logic 0. The negated Y5 output of decoder 100 is connected by NM5 conductor 103 to the negated reset input of flip-flop 134. The negated Y6 output of decoder 100 is connected by NM6 conductor 104 to the negated set of flip-flop 134. Therefore, when microprocessor 87 causes the NM5 signal on conductor 103 to become a logic 0, the Q output of flip-flop 134 becomes a logic 0. When microprocessor 87 causes the NM6 signal on conductor 104 to become a logic 0, the Q output of flip-flop 134 becomes a logic 1.

Slave microprocessor 122, 3-to-8 decoder 123 and flip-flop 128 perform in a similar fashion. The SA0-SA2 signals of SADDR bus 170 are connected to the A0-A2 inputs of decoder 123. The negated data enable (NDEN) output of slave microprocessor 122 is connected by conductor 125 to the negated CS2 and CS3 inputs of decoder 123. The CS1 input of decoder 123 is connected to a logic 1. The negated Y5 output of decoder 123 is connected by conductor 131 to the negated reset input of flip-flop 128. The negated Y6 output of decoder 123 is connected by conductor 130 to the negated set input of flip-flop 128. Therefore, when slave microprocessor 122 causes decoder 123 to place a logic 0 on its negated Y5 output, the Q output of flip-flop 128 becomes a logic 0. Also, when slave microprocessor 122 causes decoder 123 to place a logic 0 on its negated Y6 output, the Q output of flip-flop 128 becomes a logic 1.

The Q output of flip-flop 134 is connected by conductor 135 to one input of a two-input OR-gate 133. The Q output of flip-flop 128 is connected by conductor 132 to the other input of gate 133. The output of gate 133 is connected by conductor 136 to the A3 input of RAM 160. Therefore, if the Q output of flip-flop 134 or flip-flop 128 is a logic 1, the A3 input of RAM 160 is a logic 1, thereby addressing the higher order eight words of RAM 160. When the Q output of both flip-flop 134 and flip-flop 128 are logic 0, the A3 input to RAM 160 is a logic 0 thereby addressing the lower order eight words in RAM 160.

It will be appreciated, from the connections to OR-gate 133, that the Q output of flip-flop 134 must be a logic 0 if slave microprocessor 122 is to be able to address the lower eight bytes of RAM 160. Likewise, the Q output of flip-flop 128 must be a logic 0 if master microprocessor 87 is to be able to address the lower eight bytes of RAM 160. Therefore, when master microprocessor 87 has completed its usage of RAM 160 and is prepared to turn control of RAM 160 over to slave microprocessor 122 then master microprocessor 87 will cause a logic 0 pulse to be present on NM5 conductor 103, thereby resetting flip-flop 134. Likewise, when slave microprocessor 122 has completed its usage of RAM 160 and is prepared to turn control over to master microprocessor 87 then slave microprocessor 122 will cause 123 to place a logic 0 on conductor 131 thereby resetting flip-flop 128.

The negated Y7 output of decoder 100 (NM7 conductor 105) and the negated Y7 output of decoder 123 (conductor 127) are used to transfer control of RAM 160 between master microprocessor 87 and slave microprocessor 122. NM7 conductor 105 is connected to the clock input of flip-flop 120 and the negated set input of flip-flop 140. The data (D) input of flip-flop 120 is connected to a logic 0. The Q output of flip-flop 120 is connected to the data (D) input of flip-flop 121. The Q output of flip-flop 121 is connected by negated slave interrupt (NSINT) conductor 95 to the negated interrupt input (NINT) of slave microprocessor 122 and to the other input of AND-gate 85. The negated Y7 output of decoder 123 is connected by conductor 127 to the negated set input of flip-flop 120 and the clock input of flip-flop 140. The data (D) input of flip-flop 140 is connected to a logic 0. The Q output of flip-flop 140 is connected by conductor 141 to the negated A/B (NA/B) input of MUX 146.

The transfer of control of RAM 160 between master microprocessor 87 and slave microprocessor 122 is as follows. When master microprocessor 87 is prepared to relinquish control to slave microprocessor 122 master microprocessor 87 causes decoder 100 to place a logic 0 pulse on NM7 conductor 105. The rising edge of this logic 0 pulse clocks a logic 0 into the Q output of flip-flop 120. On the rising edge of the CLKOUT signal from slave microprocessor 122 on conductor 124 this logic 0 is then clocked onto the Q output (NSINT conductor 95) of flip-flop 121. The logic 0 on NSINT conductor 95 interrupts slave microprocessor 122. This interrupt means that slave microprocessor 122 may take control of RAM 160. The logic 0 pulse on NM7 conductor 105 also causes the Q output of flip-flop 140 to place a logic 1 onto conductor 141. Conductor 141 is connected to the NA/B input of MUX 146 and to one input of a two-input NAND-gate 154. The logic 1 on its NA/B input causes MUX 146 to connect address lines SA0-SA2 to RAM 160 address inputs A0-A2 and to connect the NWEN signal on conductor 126 from slave microprocessor 122 to the negated write enable input of RAM 160. The negated Q output of flip-flop 140 is connected by conductor 142 to one input of a three-input NAND-gate 143. The output of gate 143 is connected by conductor 144 to the negated output enable (OE) input of buffer 162. The logic 0 pulse on NM7 conductor 105 causes flip-flop 140 to place a logic 0 onto conductor 142 and therefore gate 143 places a logic 1 onto conductor 144 which disables the outputs of buffer 162 thereby preventing microprocessor 87 from transferring data to or from RAM 160.

The negated data enable (NDEN) output of slave microprocessor 122 is also connected by conductor 125 to one input of a two-input AND-gate 155 and to the direction control (DIR) input of buffer 157. When slave microprocessor 122 places a logic 0 onto NDEN conductor 125 the output of gate 155 becomes a logic 0. The output of gate 155 is connected by conductor 156 to the negated output enable (OE) input of buffer 157. The logic 0 on conductor 156 therefore enables the outputs of buffer 157. Also, the logic 0 on NDEN conductor 125 is provided to the DIR control input of buffer 157. The logic 0 on conductor 125 and the logic 0 on conductor 156 therefore cause buffer 157 to transfer data from RAM 160 to slave microprocessor 122.

Data is transferred from slave microprocessor 122 to RAM 160 by causing microprocessor 122 to place a logic 1 onto NDEN conductor 125 and placing logic 0 onto NWEN conductor 126. The logic 0 on NWEN conductor 126 passes through MUX 146 and places a logic 0 onto conductor 151, which is connected to the negated write enable input of RAM 160. Conductor 151 is also connected to the input of inverter 152. The output of inverter 152 is connected to the other input of gate 154. Since conductor 151 has a logic 0 on it, the output of inverter 152 on conductor 153 will be a logic 1. It will be recalled that the Q output of flip-flop 140 on conductor 141 is also a logic 1. Therefore, the output of gate 154 will be a logic 0 and the output of gate 155 on conductor 156 will also be a logic 0. Therefore, the DIR input to buffer 157 is a logic 1 and the negated output enable input is a logic 0 so that buffer 157 transfers data from microprocessor 122 to RAM 160.

Slave microprocessor 122 receives its operating instructions and certain parameters from an external ROM 167. In the preferred embodiment, memory 167 is a two kiloword (2K) by 16 bit memory. The CS2 and CS3 chip select inputs of memory 167 are connected to a logic 1. The SA0-SA10 lines of SADDR address bus 170 are connected to the SA0-SA10 address inputs of memory 167. The SD0-SD15 lines of SDATA bus 171 are connected to the SD0-SD15 input/outputs of memory 167. The negated memory enable NMEN output of slave microprocessor 122 is connected by conductor 163 to the input of inverter 164. The output of inverter 164 is connected to one input of a two-input NAND-gate 165. Slave microprocessor 122 also provides the CLKOUT signal on conductor 124 to the other input of gate 165. The output of gate 165 is connected by conductor 166 to the negated chip select (CS1) input of ROM 167. The transfer of data from ROM 167 to microprocessor 122 is therefore synchronized to the CLKOUT signal.

Assume now that slave microprocessor 122 has completed its transfer of data with respect to RAM 160 and is ready to transfer control of RAM 160 to master microprocessor 87. Slave microprocessor 122 will therefore cause decoder 123 to place a logic 0 pulse on conductor 127. The logic 0 pulse on conductor 127 sets the Q output of flip-flop 120 to a logic 1. On the next positive transition of the CLKOUT signal on conductor 124 this logic 1 is clocked through flip-flop 121 and appears on NSINT conductor 95. This resets the interrupt to slave microprocessor 122 and, via gate 85, resets (logic 1) the polled interrupt request input (NBIO) of master microprocessor 87. It will be recalled that NSINT conductor 95 becomes a logic 0 on the rising edge of a logic 0 pulse on NM7 conductor 105. Therefore, input NBIO will be a logic 0 once master microprocessor 87 has transferred control to slave microprocessor 122 and remain a logic 0 until slave microprocessor 122 transfers control back to master microprocessor 87 by placing a logic 0 pulse on conductor 127. When the NBIO input becomes a logic 1 again then master microprocessor 87 knows that slave microprocessor 122 has finished transferring data to/from RAM 160 and therefore master microprocessor 87 can transfer data to/from RAM 160.

It should also be noted that upon the rising edge of the logic 0 pulse on conductor 127 a logic 0 is clocked onto the Q output of flip-flop 140 and a logic 1 is clocked onto the negated Q output of flip-flop 140. The logic 0 on conductor 141 (Q output) forces the output of gate 154 to a logic 1. When the output of gate 154 is a logic 1 gate 155 acts simply as a noninverting buffer. Then, when the NDEN signal from slave microprocessor 122 on conductor 125 is a logic 1 the outputs of buffer 157 will be disabled. However, if NDEN conductor 125 has a logic 0 placed on it by microprocessor 122 then buffer 157 will allow data to be transferred from bus 161 to microprocessor 122. This particular feature is not used in the preferred embodiment.

The logic 0 on conductor 141 also causes MUX 146 to connect the MA0-MA2 address lines from master microprocessor 87 to the A0-A2 address inputs of RAM 160, and to connect the NMWEN output from microprocessor 87 to the negated write enable input of RAM 160. Therefore, RAM 160 is now under the control of master microprocessor 87.

The negated Q output of flip-flop 140 is connected by conductor 142 to one input of a three-input NAND-gate 143. A logic 0 on conductor 142 therefore disables gate 143 and a logic 1 enables gate 143. NMDEN conductor 97 is connected to the input of inverter 98. The output of inverter 98 is connected to one input of two-input OR-gate 145. The Z output of MUX 146 on conductor 151 is connected to the input of inverter 152. The output of inverter 152 is connected to the other input of gate 145. The output of gate 145 is connected to another input of gate 143. RAMEN conductor 107 is also connected to an input of gate 143. The output of gate 143 is connected by conductor 144 to the negated output enable input of buffer 162. Data is transferred from RAM 160 to master microprocessor 87 by causing master microprocessor 87 to place a logic 1 onto RAMEN conductor 107 and NMWEN conductor 96 and a logic 0 pulse onto NMDEN conductor 97. This causes a logic 1 pulse to appear at the gate of 145, a logic 0 pulse to appear at the output of gate 143, and the outputs of buffer 162 to be enabled. The logic 0 on NMDEN conductor 97 also causes buffer 162 to transfer data in the direction from RAM 160 to microprocessor 87 at the time the outputs are enabled.

Data is transferred from microprocessor 87 to RAM 160 by causing microprocessor 87 to place a logic 1 onto RAMEN conductor 107 and NMDEN conductor 97 while placing a logic 0 pulse onto NMWEN conductor 96. The logic 0 pulse on NMWEN conductor 96 causes a logic 0 pulse at the negated write enable input of RAM 160, causes a logic 1 pulse to appear at the output of inverter 152, causing a logic 1 pluse to appear at the output of gate 145, and the logic 0 pulse to appear at the output of gate 143. The logic 0 pulse from gate 143 enables the output of buffer 162. The logic 1 on NMDEN conductor 97 causing buffer 162 to be activated in a manner to transfer data from microprocessor 87 toward RAM 160 during the logic 0 pulse when its outputs are enabled.

Figure 6:
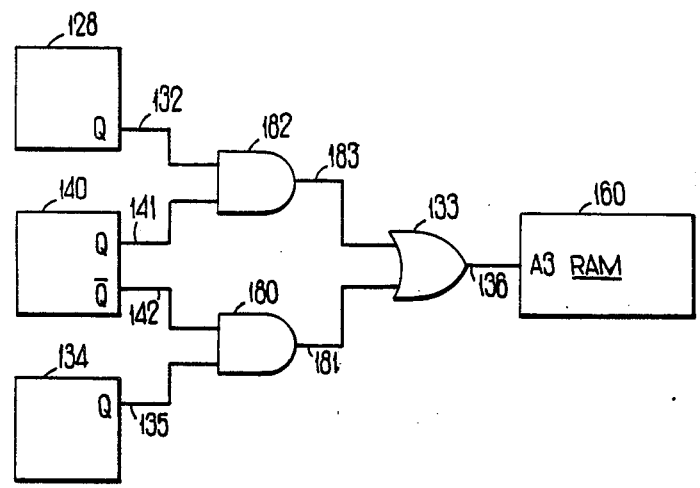
FIG. 6 is a schematic diagram of an alternative embodiment for controlling the memory.

Turn now to FIG. 6 which is a schematic diagram of an alternative embodiment of the RAM address circuit. The alternative embodiment requires two additional gates 180 and 182 but has the advantage in that processors 87 and 122 are not required to reset flip-flops 134 and 128, respectively, before transferring control to the alternate microprocessor. In this alternative embodiment, the Q output of flip-flop 134 is connected by conductor 135 to one input of a two-input AND-gate 180. The negated Q output of flip-flop 140 is connected by conductor 142 to the other input of gate 180. The output of gate 180 is connected by conductor 181 to one input of two-input OR-gate 133. The output of gate 133 is connected by conductor 136 to the A3 input of RAM 160. The Q output of flip-flop 128 is connected by conductor 132 to one input of a two-input AND-gate 182. The Q output of flip-flop 140 is connected by conductor 141 to the other input of gate 182. The output of gate 182 is connected by conductor 183 to the other input of gate 133. It will be recalled that when master microprocessor 87 has control the Q output of flip-flop 140 is a logic 0 and the negated Q output is a logic 1. This means that, when master microprocessor 87 has control, gate 182 will be disabled and gate 180 enabled. Therefore, the A3 input of RAM 160 will correspond to the Q output of flip-flop 134, regardless of the state of the output of flip-flop 128. Similarly, when slave microprocessor 122 has control the Q output of flip-flop 140 will be a logic 1 and the negated Q output will be logic 0. In this case gate 180 will be disabled and gate 182 will be enabled. Now the A3 input to RAM 160 corresponds to the Q output of flip-flop 128, regardless of the state of flip-flop 134. Therefore, the addition of gates 180 and 182 has eliminated the requirement for resetting flip-flops 128 and 134 prior to transferring control.

Included in the other modem circuits 80 are a codec and clock generator for driving the codec. In the preferred embodiment, the clock for the codec is generated by dividing another readily available clock by 1.5. Most conventional divide-by-1.5 circuits use one or more feedback pulses so that the input to the first stage of the divider has a higher frequency than the reference clock frequency. This means that one or more stages of the divider chain must be able to run at a frequency which is higher than the reference clock frequency or the desired clock frequency. This higher input frequency, and the circuit required to accommodate it, typically mean higher costs, greater power requirements, and greater decoupling requirements.

Figure 7:
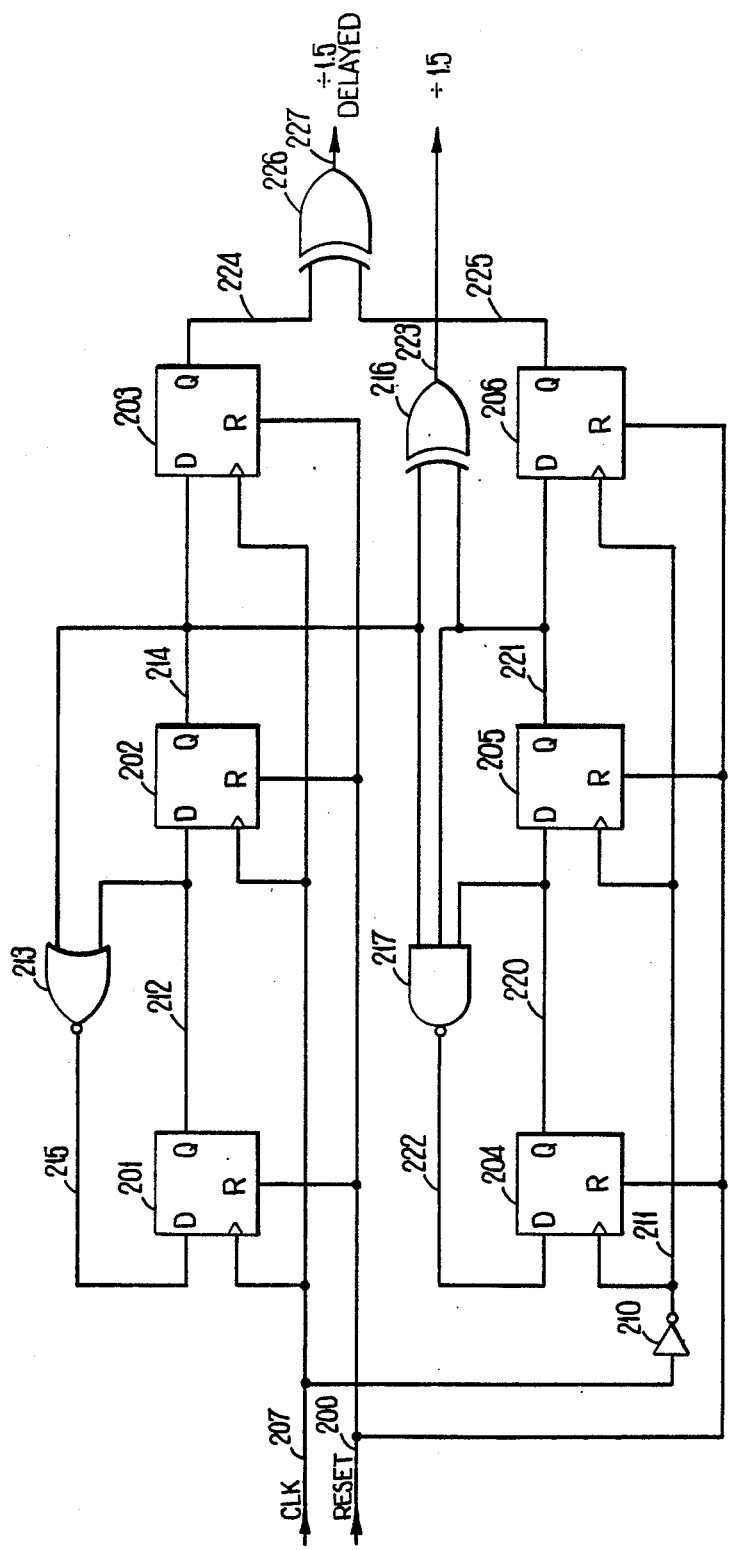
FIG. 7 is a schematic diagram of the preferred embodiment of the divide-by-1.5 divider.

Turn now to FIG. 7 which is a schematic diagram of a divide-by-1.5 circuit used in other modem circuits 80 of the preferred embodiment. In the divider shown in FIG. 7 there are no feedback clock pulses and therefore it is adequate for the devices in the divider chain to be capable of operating at the reference clock frequency. Reset conductor 200 is connected to the reset (R) input of flip-flops 201, 202, 203, 204, 205, and 206. The reference clock (CLK) on conductor 207 is provided to the clock inputs of flip-flops 201, 202, and 203, and to the input of inverter 210. The output of inverter 210 is the inverted clock and is connected by conductor 211 to the clock inputs of flip-flops 204, 205, and 206. The Q output of flip-flop 201 is connected by conductor 212 to the D input of flip-flop 202 and to one input of a two-input NOR-gate 213. The Q output of flip-flop 202 is connected by conductor 214 to the other input of gate 213, the D input of flip-flop 203, one input of a three-input NAND-gate 217 and one input of exclusive-OR (XOR) gate 216. The output of gate 213 is connected by conductor 215 to the D input of flip-flop 201. The Q output of flip-flop 203 is connected by conductor 224 to one input of XOR-gate 226.

The Q output of flip-flop 204 is connected by conductor 220 to the D input of flip-flop 205 and a second input of gate 217. The Q output of flip-flop 205 is connected by conductor 221 to the D input of flip-flop 206, the other input of gate 216, and the third input of gate 217. The output of gate 217 is connected by conductor 222 to the D input of flip-flop 204. The Q output of flip-flop 206 is connected by conductor 225 to the other input of gate 226. The output of gate 216 on conductor 223 is the reference clock frequency on conductor 207 divided by 1.5. The output of gate 226 on conductor 227 is also the clock on conductor 207 divided by 1.5 but, because of flip-flops 203 and 206, lags behind the signal on conductor 223.

Figure 8:
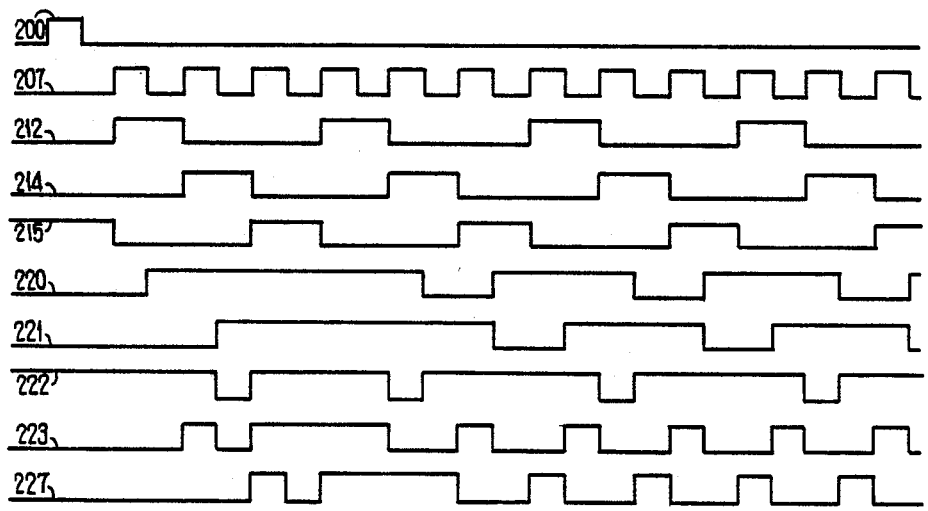
FIG. 8 is an illustration of the wave forms in the preferred embodiment of the divide-by-1.5 divider.

Turn now to FIG. 8 which illustrates the wave forms present in the circuit of FIG. 7. It will be seen that the circuit formed by flip-flops 201 and 202 and gate 213 form a divide-by-3 divider. Also, if one disregards the input to gate 217 from flip-flop 202 then the circuit formed by flip-flops 204 and 205 and gate 217 forms a divide-by-3 divider. Furthermore, from an inspection of the wave form on conductor 221 it will be appreciated that the output of flip-flop 205 still corresponds to a divide-by-3. Therefore, the input to gate 217 from flip-flop 202 provides a synchronization signal whereby the operation of the circuit formed by components 204, 205, and 217 is synchronized to the operation of the circuit formed by components 201, 202, and 213. The divide-by-1.5 operation is achieved by exclusive-ORing the outputs of flip-flops 202 and 205. The phase difference between the outputs of flip-flops 202 and 205 provides the divide-by-1.5 output as shown on conductor 223.

By using two additional flip-flops 203 and 206, and exclusive-OR gate 226 a phase delayed verison of the divide-by-1.5 signal on conductor 223 is obtained on conductor 227. Flip-flops 203 and 206 merely delay the outputs of flip-flops 202 and 205, respectively, by one reference clock cycle (conductor 207).

From an inspection of the wave forms in FIG. 8 it will be appreciated that there are no feedback pulses present which would require a device, such as a flip-flop, to operate at a speed higher than the reference clock (conductor 207).

Without the connection between flip-flop 202 and gate 217 the outputs of gates 216 and 226 would still be divide-by-1.5 as long as the upper and lower half half circuits remained in sync. However, if a noise pulse should occur and cause the two halves to lose sync with respect to one another, then the output would no longer be a divide-by-1.5. Furthermore, the two halves would remain out of sync until reset. Connecting the output of flip-flop 202 to the input of gate 217 synchronizes the upper and lower half circuits so that, if even synchronization between the upper and lower half circuits is interrupted because of a noise pluse, the two halves will automatically resynchronize and the outputs of gates 216 and 226 will again be divide-by-1.5.

Figure 9:
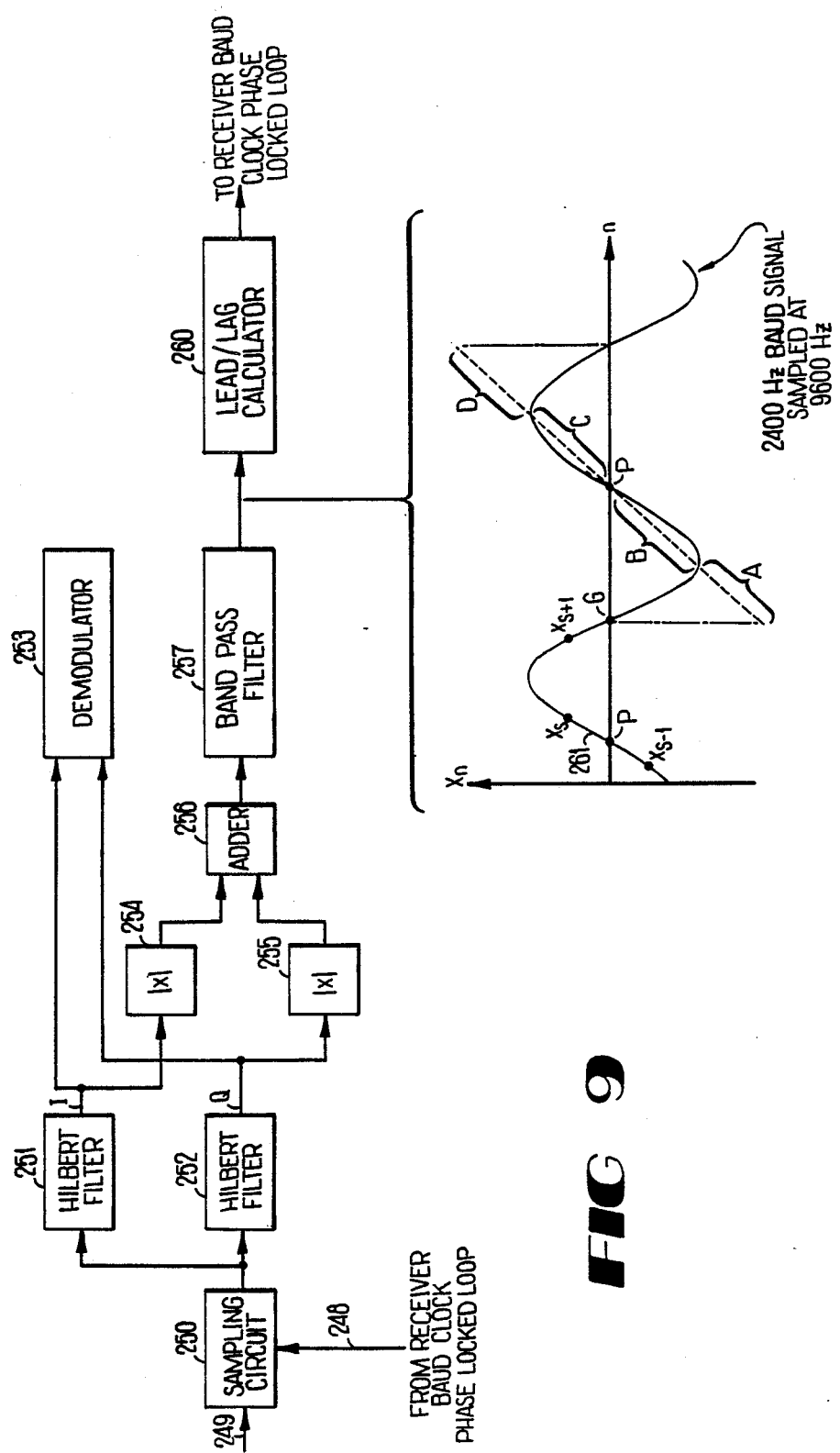
FIG. 9 is a block diagram of the preferred embodiment of the receiver baud clock phase lock loop control circuit.

Turn now to FIG. 9 which is a block diagram of an improved baud clock recovery circuit. In the preferred embodiment, components 250 through 260 are not separately implemented but are implemented by microprocessors 87 and 122. Sampling circuit 250 samples the incoming signal on conductor 249 at 9600 samples per second. Sampling circuit 250 is controlled over conductor 248 by the receiver baud clock phase locked loop (not shown). The output of sampling circuit 250 is provided to two Hilbert filters 251 and 252 wherein the I and Q components, respectively, of the sampled signal are recovered. The output of filter 251 is provided to demodulator 253 and to an absolute value circuit 254. The output of filter 252 is also provided to demodulator 253 and to an absolute value circuit 255. The output of circuits 254 and 255 are connected to the inputs of adder 256. The output of adder 256 is then provided to the input of a 2400 hertz bandpass filter 257. The output of bandpass filter 257 is then provided to a lead/lag calculator 260. The output of the lead/lag calculator 260 is provided to the receiver baud clock phase lock loop (not shown) to adjust the timing of the sampling points.

The output of band pass filter 257 will be the recovered baud clock. In one application, the baud clock will be 2400 Hertz and the recovered baud clock waveform 261 will be as shown in the inset. In order to minimize the data error rate, it is desired that the sampling of the incoming signal on conductor 249 be synchronized with the zero crossing points P of the recovered baud clock. This is accomplished by determining which quadrant the primary sampling point lies in and then adjusting the receiver baud clock phase lock loop so that the primary sampling point lies exactly at point P. The quadrant is determined by comparing the sign of the signal 261 of the primary sampling point with the sign of the signal at the preceding non-primary sampling point. For example, if the primary sampling point is $X_S$ and the immediately preceding non-primary sampling point is $X_{S-1}$ then the primary sampling point $X_S$ is in the quadrant defined as C. However, if the primary sampling point is $X_{S+1}$ then the immediately preceding non-primary sampling point would be $X_S$ and therefore, since the signs are the same and positive, the primary sampling point $X_{S+1}$ would be in the quadrant defined as D. Since the quadrant in which the primary sampling point lies is now determined lead/lag calculator 260 can then adjust the receiver baud clock phase lock loop in the proper direction to cause the primary sampling point to coincide with point P. For example, if the primary sampling point were point $X_S$ then the primary sampling point would be lagging point P and it would be necessary to advance the sampling points. Similarly, if the primary sampling point were point $X_{S-1}$ then the primary sampling point would be leading point P and it is necessary to retard the timing of the sampling.

The position of the sampling points is adjusted by advancing or retarding the phase of the baud clock. This can be done in fixed increments of, for example, one degree.

However, if a fixed increment size is used, then it may be impossible for the primary sampling point to fall exactly at a point P and therefore the sampling point would oscillate (jitter) around point P as the step size caused the primary sampling point to alternately lead and lag point P. To avoid this problem a small step size and a lock-on window could be used but, if the primary sampling point fell in quadrants A or D, then the small step size would require an excessively long time to move the sampling point from quadrant A or D to point P.

In the preferred embodiment, the step size necessary to move the primary sampling point to point P is not fixed but is calculated based upon the quadrant at which the primary sampling point presently lies and the magnitudes of both the primary sampling point and the immediately preceding non-primary sampling point. Therefore, the step size used to move a primary sampling point lying at $X_{S+1}$ would be greater than the step size used to move a primary sampling point located at $X_S$.

Since the output of bandpass filter 257 is a 2400 hertz signal 261 sample at 9600 hertz (sample/second) there are four sampling points per cycle of the signal 261. On startup, lead/lag calculator 260 determines which of these four sampling points is closest to point P and thereafter this sampling point is designated as the primary sampling point. Thereafter, lead/lag calculator 260 adjusts the recovered baud clock to cause the primary sampling point to occur at point P.

In the preferred embodiment, this startup procedure is that described in the above-reference U.S. patent application Ser. No. 885,927.

In an alternative embodiment, no attempt is made to determine which sampling point lies closest to point P. Instead, one of the sampling points is simply designated as the primary sampling point.

Figure 10:
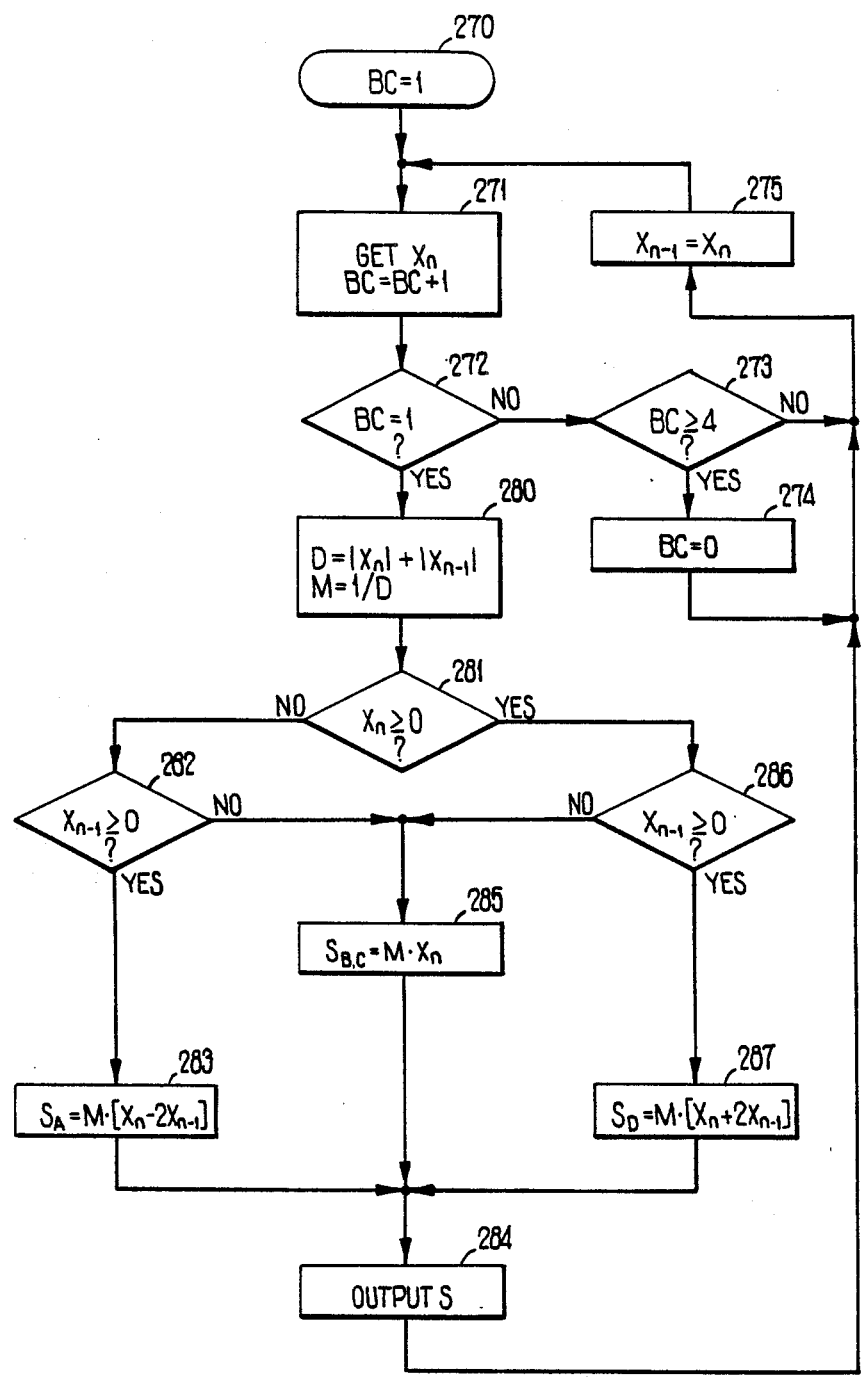
FIG. 10 is a flow chart of the process used by the preferred embodiment to calculate the lead/lag step size.

Turn now to FIG. 10 which is a flow chart of the procedure used by lead/lag calculator 260 to compute the step size after the primary sampling point has been defined. Since there are four samples per cycle of the signal and only one of the samples is the primary sampling point, it is necesary to keep track of the primary sampling point. This is done by using a baud clock counter (BC) and incrementing it at every sample time. In FIG. 10 it is assumed, for convenience, that it has been previously defined that the primary sampling point is the sampling point at which the baud clock counter (BC) equals 1. Therefore, BC is set to 1 in step 270. Then, in step 271, the next sample point $X_n$ is obtained and BC is incremented. At decision point 272 BC is analyzed to determine if the sample point $X_n$ is the primary sampling point (BC=1). If not then decision point 273 determines whether counter BC has reached its upper limit. If so, then BC is set to 0 in step 274. If BC was less than four, and also after step 274 is executed, then $X_n$ is stored as $X_{n-1}$ in step 275. The calculator then returns to step 271, gets the next value of $X_n$, and again increments BC.

If BC equals 1 then $X_n$ is the primary sampling point and the lead/lag step size calculation should be performed. Table 3 lists the equations for the step size calculation by quadrant. K is a scale factor and has a value of unity in the preferred embodiment. It will be noted that the equations for all four quadrants have a common denominator. Therefore, step 280 calculates the common denominator D. However, since multiplication is faster than division, rather than dividing the numerator of the equation by the denominator the step size S is obtained by inverting the denominator and then multiplying the numerator by the inverted denominator. In the preferred embodiment, D is obtained by use of a look up table and is limited, for convenience, to an 8 bit word. Therefore, in step 280, after calculating the denominator D, the inverted denominator M is calculated. Decision points 281, 282 and 286 determine which quadrant the primary sample point $X_n$ is located. If $X_n$ is greater than zero and the preceding non-primary sampling point $X_{n-1}$ is greater than zero then the primary sampling point is in quadrant D and the step size S is calculated according to the equation in step 287.

TABLE 3

| | | STEP SIZE EQUATIONS | | |
|---|---|---|---|---|
| $X_n$ | $X_{n-1}$ | Quadrant | S | Step |
| Neg. | Pos. | A | $\dfrac{(X_n - 2(X_{n-1}))K}{|X_n| + |X_{n-1}|}$ | 283 |
| Neg. | Neg. | B | $\dfrac{X_n K}{|X_n| + |X_{n-1}|}$ | 285 |
| Pos. | Neg. | C | $\dfrac{X_n K}{|X_n| + |X_{n-1}|}$ | 285 |
| Pos. | Pos. | D | $\dfrac{(X_n + 2(X_{n-1}))K}{|X_n| + |X_{n-1}|}$ | 287 |

If $X_n$ is less than zero and $X_{n-1}$ is greater than zero then the primary sample point has occurred in quadrant A and the step size S is calculated according to the equation in step 283. If $X_{n-1}$ is negative then the primary sampling point $X_n$ will be in quadrants B or C. Therefore the step size S is calculated according to the equation in block 285. After the step size S is calculated, according to steps 283, 285 or 287, as appropriate, then the step size is output to the recovered baud clock phase lock loop in step 284. From step 284 lead/lag calculator 260 returns to step 275 and then the process begins again. In the preferred embodiment, a step size S value of 1 corresponds to a change of approximately 240 nanoseconds in the position of the primary sample point. Therefore, the step size is dynamically adjusted according to the distance between the primary sampling point and point P. As a result, the sampling point converges upon point P at a rate consistent with a very large step size, and locks onto point P with the stability and freedom from jitter provided by a minimally small step size.

Although described with respect to the positive-going zero-crossing point P it will be appreciated that the above can be used for the negative-going zero-crossing point G by simply changing the sign of the step size computed according to Table 3 and FIG. 9.

Also, it will be appreciated that if the characteristic frequency of signal 261 is 1200 Hertz, then the sampling frequency would preferably be four times the characteristic frequency, or 4800 Hertz. Furthermore, even if the 1200 Hertz signal 261 is sampled at, for example, 9600 Hertz, the above can be used by simply discarding every other sample.

From the above, it will be appreciated that the present invention describes a modem which uses two digital signal processing microprocessors and other techniques in order to effect savings in speed, processing time, and memory requirements, achieve a fast half-duplex line turnaround, and maintain compatibility with existing 300, 1200 and 2400 bps modems while providing 4800 and 9600 bps capability. It will also be appreciated that standard, well known techniques such as scrambling, descrambling, frequency synthesizing, power supply construction, telephone line interfacing, etc., are available in many printed publications and patents and need not be detailed herein.

Also, from the detailed description above, it will be appreciated that many modifications and variations of the preferred embodiment will become apparent to those skilled in the art. Therefore, the present invention is to be limited only by the claims below.

We claim:

1. A V.22 bis compatible handshake method for an originating modem for establishing communications with an answering modem at a selected speed of 1200 bits per seconds (bps), 2400 bps, or greater than 2400 bps, comprising:
   (a) said originating modem sending a first sequence for a first predetermined period;
   (b) said originating modem sending a second sequence for a second predetermined period while listening for said first sequence from said answering modem;
   (c)
   (1) if said first sequence from said answering modem was not heard by said originating modem, said originating modem commencing communications with said answering modem at 1200 bps;
   (2) if said first sequence from said answering modem was heard by said originating modem, said originating modem sending a third sequence for a third predetermined period while listening for said second sequence from said answering modem;
   (d)
   (1) if said second sequence from said answering modem was not heard by said originating modem, said originating modem continuing to send said third sequence for an additional period of time and then commencing training and communications with said answering modem at 2400 bps; and
   (2) if said second sequence from said answering modem was heard by said originating modem, said originating modem commencing training and communications with said answering modem at a speed greater than 2400 bps.

2. The method of claim 1 wherein said first sequence is unscrambled double dibits 00 and 11 at 1200 bps.

3. The method of claim 2 wherein said second sequence is an unscramble binary 0 at 1200 bps.

4. The method of claim 3 wherein said third sequence is a scrambled binary 1 at 1200 bps.

5. A V.22 bis compatible handshake method for an originating modem for establishing communications with an answering modem at a selected speed of 1200 bps, 2400 bps, 4800 bps, or 9600 bps, comprising:
   (a) said originating modem sending a first sequence for a first predetermined period;
   (b) said originating modem sending a second sequence for a second predetermined period while listening for said first sequence from said answering modem;
   (c)
   (1) if said first sequence from said answering modem was not heard by said originating modem, said originating modem commencing communications with said answering modem at 1200 bps;
   (2) if said first sequence from said answering modem was heard by said originating modem, said originating modem sending a third sequence for a third predetermined period while listening for said second sequence from answering modem;
   (d)
   (1) if said second sequence from said answering modem was not heard by said originating modem, said originating modem continuing to send said third sequence for an additional period of time and then commencing training and communications with said answering modem at 2400 bps; and
   (2) if said second sequence from said answering modem was heard by said originating modem, said originating modem then sending a fourth sequence followed by a rate request sequence;
   (e) said originating modem listening for said fourth sequence from said answering modem and training an adaptive equalizer in said originating modem in accordance with said fourth sequence;
   (f) said originating modem listening for said rate request sequence from said answering modem;
   (g)
   (1) if said rate request sequence sent by said originating modem is different from said rate request sequence received from said answering modem, said originating modem commencing communications at 4800 bps;
   (2) if said rate request sequence sent by said originating modem and said rate request sequence received from answering modem both specify 4800 bps, said originating modem commencing communications at 4800 bps; and
   (3) if said rate request sequence sent by said originating modem and said rate request sequence received from said answering modem both specify 9600 bps, said originating modem commencing training and communications at 9600 bps.

6. The method of claim 5 wherein said first sequence is unscrambled double dibits 00 and 11 at 1200 bps.

7. The method of claim 6 wherein said second sequence is an unscrambled binary 0 at 1200 bps.

8. The method of claim 7 wherein said third sequence is a scrambled binary 1 at 1200 bps.

9. The method of claim 8 wherein said fourth sequence comprises a non-phase encoded scrambled binary 1 at 4800 bps.

10. The method of claim 9 wherein said rate request sequence specifying 4800 bps comprises a scrambled binary 1 at 4800 bps.

11. The method of claim 9 wherein said rate request sequence specifying 9600 bps comprises a scrambled binary 01 at 4800 bps.

12. A V.22 bis compatible handshake method for an answering modem for establishing communications with a calling modem at a selected speed of 1200 bits per second (bps), 2400 bps, or greater than 2400 bps, comprising:
   (a) said answering modem listening for a first sequence from said calling modem;
   (b)
   (1) if said first sequence from said calling modem was not heard by said answering modem, said answering modem commencing communications with said calling modem at 1200 bps;
   (2) if said first sequence from said calling modem was detected by said answering modem, said answering modem sending said first sequence to said calling modem and listening for a second sequence from said calling modem;
   (c)
   (1) if said second sequence from said calling modem is not heard by said answering modem, said answering modem commencing training and communications at 2400 bps;

(2) if said second sequence from calling modem was heard by said answering modem, said answering modem sending said second sequence and commencing training and communications at a rate greater than 2400 bps.

13. The method of claim 12 wherein said first sequence comprises unscrambled double dibits 00 and 11 at 1200 bps.

14. The method of claim 13 wherein said second sequence comprises an unscrambled binary 0 at 1200 bps.

15. A V.22 bis compatible handshake method for an answering modem for establishing communications with a calling modem at a selected speed of 1200 bits per second (bps), 2400 bps, or greater than 2400 bps, comprising:
  (a) said answering modem listening for a first sequence from said calling modem;
  (b)
    (1) if said first sequence from said calling modem was not heard by said answering modem, said answering modem commencing communications with said calling modem at 1200 bps;
    (2) if said first sequence from said calling modem was detected by said answering modem, said answering modem sending said first sequence to said calling modem and listening for a second sequence from said calling modem;
  (c)
    (1) if said second sequence from said calling modem is not heard by said answering modem, said answering modem commencing training and communications at 2400 bps;
    (2) if said second sequence is heard from said calling modem by said answering modem, said answering modem sending said second sequence and then listening for said third sequence from said calling modem;
  (d) said answering modem using said third sequence from said calling modem to train the adaptive equalizer in said answering modem;
  (e) said answering modem listening for a rate request sequence from said calling modem;
  (f)
    (1) if said rate request sequence from said calling modem designates 4800 bps, said answering modem sending said thrid sequence to said calling modem, sending said rate request sequence designating 4800 bps to said calling modem, and then commencing communications at 4800 bps;
    (2) if said rate request sequence from said calling modem designates 9600 bps and said answering modem cannot accomodate 9600 bps then said answering modem sending said third sequence, sending said rate request sequence designating 4800 bps, and commencing communications at 4800 bps; and
    (3) if said rate request sequence from said calling modem designates 9600 bps, and said answering modem can accommodate 9600 bps, sending said third sequence, sending said rate request sequence designating 9600 bps, and then said answering modem commencing training and communications at 9600 bps.

16. The method of claim 15 wherein said first sequence comprises unscrambled double dibits 00 and 11 at 1200 bps.

17. The method of claim 16 wherein said second sequence comprises an unscrambled binary 0 at 1200 bps.

18. The method of claim 17 wherein said third sequence comprises a non-phase encoded scrambled binary 1 at 4800 bps.

19. The method of claim 15 wherein said rate request sequence designating 4800 bps comprises a scrambled binary 1 at 4800 bps.

20. The method of claim 15 wherein said rate request sequence designating 9600 bps comprises a scrambled binary 01 at 4800 bps.

21. The method of claim 9 wherein said fourth sequence comprises 4 points of a 32 point phase-amplitude constellation, each point of said 4 points being displaced from the remaining 3 of said 4 points by an integer multiple of 90 degrees.

22. The method of claim 18 wherein said third sequence comprises 4 points of a 32 point phase-amplitude constellation, each point of said 4 points being displaced from the remaining 3 of said 4 points by an integer multiple of 90 degrees.

23. A fast line-turnaround method for transferring data between two modems operating in the half-duplex mode, comprising:
  (a) a data transfer protocol comprising:
    (1) sending a first idle signal for a first predetermined period;
    (2) sending at least one of a predetermined flag;
    (3) sending a data frame, said data frame not exceeding a predetermined number of bytes;
    (4) repeating steps (a) (2) and (a) (3) until a predetermined number of said data frames have been sent;
    (5) sending at least one of said predetermined flag; and
    (6) sending a second idle signal for a second predetermined period; and
  (b) a no-data line turnaround protocol, comprising:
    (1) sending said first idle signal for a third predetermined period;
    (2) sending at least one said predetermined flag; and
    (3) sending said second idle signal for a fourth predetermined period.

24. The method of claim 23 wherein said first predetermined period is approximately 15 milliseconds.

25. The method of claim 23 wherein said first idle signal is the mark idle signal.

26. The method of claim 25 wherein said second predetermined period is approximately 15 milliseconds.

27. The method of claim 23 wherein said predetermined flag is the binary sequence 01111110.

28. The method of claim 23 wherein said predetermined number of bytes is 128.

29. The method claim 23 wherein said second idle signal is the mark idle signal.

30. The method of claim 29 wherein said third predetermined period is approximately 15 milliseconds.

31. The method of claim 23 wherein said fourth predetermined period is approximately 15 milliseconds.

32. The method of claim 23 wherein said predetermined number of said data frames is seven.

33. The method of claim 32 wherein said predetermined number of bytes is 128.

34. For use with a calling modem and an answering modem engaged in half-duplex communications, a method for correcting for a loss of equalization in an equalizer in said calling modem, comprising:

a calling modem procedure comprising:
  detecting said loss of equalization in said equalizer in said calling modem;
  waiting until said answering modem has completed transmitting;
  sending a tone for a first predetermined period;
  detecting said tone sent by said answering modem;
  being silent for a third predetermined period;
  sending a training sequence to said answering modem for a fourth predetermined period; and
  receiving said training sequence from said answering modem and using said training sequence to adjust said equalizer in said calling modem; and
an answering modem procedure comprising:
  detecting said tone sent by said calling modem;
  sending said tone for a second predetermined period;
  being silent during said third predetermined period;
  being silent during said fourth predetermined period; and
  sending said training sequence to said calling modem for a fifth predetermined period.

35. The method of claim 34 wherein said training sequence comprises a first sequence for coarsely adjusting said equalizer and a second sequence for finely adjusting said equalizer.

36. The method of claim 35 wherein said first sequence comprises a non-phase encoded scramble binary 1 at 9600 bps.

37. The method of claim 35 wherein said second sequence comprises a scrambled binary 1 at 9600 bps.

38. The method of claim 34 wherein said answering modem receives said training sequence from said calling modem during said fourth predetermined period and uses said training sequence to train an equalizer in said answering modem.

39. The method of claim 34 wherein said first predetermined period and said second predetermined period are each approximately 150 milliseconds.

40. The method of claim 34 wherein said second predetermined period and said third predetermined period are each approximately 250 milliseconds.

41. The method of claim 34 wherein said fourth predetermined period is approximately 1.75 seconds.

42. The method of claim 38 wherein said fourth predetermined period is approximately 1.75 seconds.

43. The method of claim 34 wherein said tone has a frequency of 320 Hz.

44. For use with a calling modem and an answering modem engaged in half-duplex communications, a method for correcting for a loss of equalization in an equalizer in said answering modem, comprising:

an answering modem procedure comprising:
  detecting said loss of equalization in said equalizer in said answering modem;
  waiting until said calling modem has completed transmitting;
  sending a tone for a first predetermined period;
  detecting said tone sent by said calling modem;
  being silent for a third predetermined period;
  receiving a training sequence from said calling modem and using said training sequence to adjust said equalizer in said answering modem; and
a calling modem procedure comprising:
  detecting said tone sent by said answering modem;
  sending said tone for a second predetermined period;
  being silent for said third predetermined period; and
  sending said training sequence to said answering modem for a fourth predetermined period.

45. The method of claim 44 wherein said answering modem procedure further comprises sending said training sequence to said calling modem for a fifth predetermined period, and said calling modem procedure further comprises receiving said training sequence from said answering modem and using said training sequence to adjust said equalizer in said calling modem.

46. The method of claim 44 wherein said training sequence comprises a first sequence for coarsely adjusting said equalizer and second sequence for finely adjusting said equalizer.

47. The method of claim 46 wherein said first sequence comprises a non-phase encoded binary 1 at 9600 bps.

48. The method of claim 46 wherein said second sequence comprises a scrambled binary 1 at 9600 bps.

49. The method of claim 44 wherein said first predetermined period and said predetermined period are each approximately 15 milliseconds.

50. The method of claim 44 wherein said third predetermined period is approximately 250 milliseconds.

51. The method of claim 44 wherein said fourth predetermined period is approximately 1.75 seconds.

52. The method of claim 45 wherein said training sequence comprises a first sequence for coarsely adjusting said equalizer and the second sequence for finely adjusting said equalizer.

53. The method of claim 45 wherein said fifth predetermined period is approximately 1.75 seconds.

54. The method of claim 44 wherein said tone has a frequency of 320 Hz.

* * * * *

UNITED STATES PATENT AND TRADEMARK OFFICE
CERTIFICATE OF CORRECTION

PATENT NO. : 4,894,847

DATED : January 16, 1990

INVENTOR(S) : Tjahjadi et al.

It is certified that error appears in the above-identified patent and that said Letters Patent is hereby corrected as shown below:

On the title page, item [75], delete "German E. Correa, Alpharetta;" and "Cynthia A. Panella, Alpharetta;".

Signed and Sealed this

Twentieth Day of August, 1991

Attest:

HARRY F. MANBECK, JR.

Attesting Officer

Commissioner of Patents and Trademarks